(12) United States Patent
Haworth et al.

(10) Patent No.: US 8,690,109 B2
(45) Date of Patent: Apr. 8, 2014

(54) AUTOMATIC GAP ADJUSTOR

(75) Inventors: Richard G. Haworth, Holland, MI (US); Harold R. Wilson, Holland, MI (US)

(73) Assignee: Haworth, Inc., Holland, MI (US)

( * ) Notice: Subject to any disclaimer, the term of this patent is extended or adjusted under 35 U.S.C. 154(b) by 231 days.

(21) Appl. No.: 13/197,069

(22) Filed: Aug. 3, 2011

(65) Prior Publication Data

US 2013/0034409 A1 Feb. 7, 2013

(51) Int. Cl.
- *A47B 96/06* (2006.01)
- *A47K 1/00* (2006.01)
- *A47K 5/00* (2006.01)
- *E04G 3/00* (2006.01)
- *E04G 5/06* (2006.01)

(52) U.S. Cl.
USPC .......... 248/219.2; 248/218.4; 248/230.1; 248/230.2; 248/346.01; 248/349.1; 248/416

(58) Field of Classification Search
USPC .......... 248/161, 416, 346.01, 349.1, 230.1, 248/230.2, 218.4, 219.2
See application file for complete search history.

(56) References Cited

U.S. PATENT DOCUMENTS

| | | | |
|---|---|---|---|
| 638,692 A * | 12/1899 | Banwell | 404/26 |
| 2,852,883 A | 9/1958 | Walsh | |
| 2,942,829 A | 6/1960 | Stiffel | |
| 3,920,103 A | 11/1975 | Haraikawa | |
| 3,954,241 A | 5/1976 | Carlson | |
| 4,334,438 A | 6/1982 | Mochida | |
| 4,402,677 A | 9/1983 | Radocaj | |
| 4,543,849 A | 10/1985 | Yamamoto et al. | |
| 4,558,544 A | 12/1985 | Albrecht et al. | |
| 4,570,506 A | 2/1986 | Yamamoto et al. | |
| 4,598,809 A | 7/1986 | Glover et al. | |
| 4,634,407 A | 1/1987 | Holtz | |
| 4,799,400 A | 1/1989 | Pickell | |
| 4,808,148 A | 2/1989 | Holtz | |
| 4,822,320 A | 4/1989 | Suzuki | |
| 4,887,705 A | 12/1989 | Solano et al. | |
| 4,917,220 A | 4/1990 | Ikegami | |
| 4,953,341 A | 9/1990 | Joos | |
| 4,991,805 A | 2/1991 | Solak et al. | |

(Continued)

OTHER PUBLICATIONS

Introduction to Zetasassi Belt and Chain Tensioners, Maryland Metrics, www.mdmetric.com/prod/q450pdf/r070p026.pdf, pp. 26-29.

(Continued)

*Primary Examiner* — Amy J Sterling
(74) *Attorney, Agent, or Firm* — Warner Norcross & Judd LLP

(57) ABSTRACT

An automatic gap adjustor is provided. The automatic gap adjustor includes an upper cammed disk, a lower cammed disk spaced apart from the upper cammed disk, and a resilient spring element therebetween. The upper cammed disk includes a first plurality of cams on an upper axial surface and a second plurality of cams on a lower axial surface. The lower cammed disk includes a third plurality of cams on an upper axial surface and a fourth plurality of cams on an undercut portion spaced apart from the upper axial surface. Opposing cams can be radially offset from each other, such that reciprocating axial movement of the upper disk relative to the lower disk can achieve a stepped rotation of the upper disk. Rotation of the upper disk can drive the automatic gap adjustor along a threaded support to eliminate a gap along a portion thereof.

13 Claims, 28 Drawing Sheets

(56) References Cited

U.S. PATENT DOCUMENTS

| | | | |
|---|---|---|---|
| 5,039,118 A * | 8/1991 | Huang | 280/47.371 |
| 5,100,081 A | 3/1992 | Thomas | |
| 5,138,897 A | 8/1992 | Beard et al. | |
| 5,156,451 A | 10/1992 | Pollock | |
| 5,178,034 A | 1/1993 | Reasoner | |
| 5,211,504 A * | 5/1993 | Trudel | 404/26 |
| 5,256,113 A | 10/1993 | Bushman et al. | |
| 5,259,265 A | 11/1993 | Gabas et al. | |
| 5,295,408 A | 3/1994 | Nagle et al. | |
| 5,370,585 A | 12/1994 | Thomey et al. | |
| 5,443,141 A | 8/1995 | Thiel et al. | |
| 5,485,762 A | 1/1996 | Rothman | |
| 5,489,011 A | 2/1996 | Reed, Jr. et al. | |
| 5,588,264 A | 12/1996 | Buzon | |
| 5,632,698 A | 5/1997 | Suzuki | |
| 5,664,461 A | 9/1997 | Kitamura | |
| 5,709,287 A | 1/1998 | Bochman | |
| 5,967,472 A | 10/1999 | Wilhelmstatter et al. | |
| 6,023,992 A | 2/2000 | Cameno | |
| 6,030,305 A | 2/2000 | Hood | |
| 6,120,403 A | 9/2000 | Suzuki et al. | |
| 6,131,482 A | 10/2000 | Klippert et al. | |
| 6,279,415 B1 | 8/2001 | Chance et al. | |
| 6,363,685 B1 | 4/2002 | Kugler | |
| 6,375,588 B1 | 4/2002 | Frankowski et al. | |
| 6,422,962 B1 | 7/2002 | Lehtovaara et al. | |
| 6,442,906 B1 | 9/2002 | Hwang | |
| 6,503,018 B2 * | 1/2003 | Hou et al. | 403/97 |
| 6,520,471 B2 | 2/2003 | Jones et al. | |
| 6,524,026 B2 * | 2/2003 | Sondrup | 404/26 |
| 6,575,858 B2 | 6/2003 | Green et al. | |
| 6,592,482 B2 | 7/2003 | Serkh | |
| 6,625,951 B1 | 9/2003 | McCarthy | |
| 6,739,560 B1 | 5/2004 | Pajerski | |
| 6,983,570 B2 | 1/2006 | Mead | |
| 7,101,295 B2 | 9/2006 | Taomo et al. | |
| 7,454,869 B2 | 11/2008 | Owen | |
| 7,455,606 B2 | 11/2008 | Markley et al. | |
| 7,717,380 B2 | 5/2010 | Kwon et al. | |
| 7,823,653 B2 | 11/2010 | Meixner et al. | |
| 7,861,487 B2 | 1/2011 | Kufner et al. | |
| 7,866,096 B2 | 1/2011 | Lee et al. | |
| 2007/0246042 A1 * | 10/2007 | Purkins et al. | 128/200.14 |
| 2009/0197721 A1 | 8/2009 | Emizu et al. | |
| 2009/0215563 A1 | 8/2009 | Sauermann et al. | |
| 2010/0087286 A1 | 4/2010 | Larouche | |
| 2011/0065539 A1 | 3/2011 | Robbins et al. | |

OTHER PUBLICATIONS

Belt and Chain Drives, Emerson Power Transmission Corp., www.emerson-etp.com/eptroot/public/schools/beltchan.pdf, pp. A105 and A112-120.

Hydraulic Automatic Primary Chain Tensioner for Sportsters, www.sohotbikes.com, 5 pgs.

Elite Tensioning Systems Belt and Chain Drives, Iwis Antriebssysteme GmbH, www.iwis.com, 24 pgs.

Graphical Depiction of Installation Examples (Chain Tensioners), Murtfeldt Junststoffe GmbH & Co., 1 pg.

Raised Floors and Adjustable Pedestals for Floor Systems, VJB Partner, www.vjbpartner.cz/en/podahyen.pdf, 7 pgs.

Pull-Only Brake 1500 & 3000 Control Cable Assembly, Cablecraft Motion Controls LLC, 4 pgs.

Soft-Lay Systems: Inter-floor Noiseless Raised Floor, Newfloor srl (www.newfloor.net), Jun. 25, 2009, 2 pgs.

Rosta Self-Tensioning Motor Mounting, Rosta Motorbase Type MB 70, Rosta (www.rosta.ch), 1 pg.

* cited by examiner

AUTOMATIC GAP ADJUSTOR

BACKGROUND OF THE INVENTION

The present invention pertains to gap adjustors, and more particularly to an automatic gap adjustor for use in connection with a variety of devices, such as raised flooring assemblies, belt/chain tensioners and Bowden cables.

Raised flooring assemblies are increasingly utilized in commercial buildings to accommodate the passage of cabling, wiring and ductwork. Such systems typically employ a series of height-adjustable pedestals in a grid-like arrangement. The pedestals support multiple removable floor panels that are spaced apart from a sub-floor. The spacing between the removable floor panels and the sub-floor can be dictated by the volume of cabling, wiring and/or ductwork, and can include a depth of between six inches and several feet. Optionally, the raised flooring assembly may be concealed with a flooring finish such as laminate or carpeting.

One generally accepted construction for height-adjustable pedestals is disclosed in U.S. Pat. No. 7,650,726 to Jacob-Bamberg et al, the content of which is hereby incorporated into the present application by reference. In this construction, each pedestal includes a hollow upright stanchion, a stem extending from partially within the stanchion, and a nut threadably engaged with the stem and bearing against the upper edge of the stanchion. The upper end of the stem can include a bracket for rigid attachment to four panels at their respective corners. Pedestal height can be adjusted with the clockwise or counterclockwise rotation of the nut about the stem. For example, as the nut translates downwardly along the stem while bearing against the stanchion, the stem increasingly extends from the stanchion to increase the pedestal height, and thus the height of the overlying floor panels. Conversely, as the nut translates upwardly along the stem while bearing against the stanchion, the stem recedes within the stanchion to decrease the pedestal height.

Repeated use of the raised flooring assembly can in some instances cause a gap to form between the upper edge of the stanchion and the lower edge of the nut. In this condition, the nut does not bear against the upper edge of the stanchion. Instead, the stem and the nut are generally suspended in position by the overlying floor panels. As persons and objects traverse the overlying floor panels, the floor panels can deflect downwardly to repeatedly drive the nut against the upper edge of the stanchion. The resulting instability is especially noticeable due to an undesirable clicking or knocking sound at each downward deflection of the overlying floor panels.

Known methods for correcting the above condition typically include a manual rotation of the nut until it bears against the upper edge of the stanchion. However, this method can involve the removal of floor finishing and floor panels, in addition to a manual inspection of each pedestal until the deficient pedestal is identified. Moreover, this method provides no assurance that further gaps will not develop after the deficient pedestal is adjusted. For example, the sub-floor can warp over time, resulting in further potential gaps between stanchions and nuts that would normally require a further inspection and adjustment.

Other devices, including mechanical drive belts, drive chains and Bowden cables, suffer from disadvantages similar to those of raised flooring assemblies, in that the extended use of these devices can create wear "gaps" that reduce their effectiveness. For instance, mechanical belts, such as automobile fan belts and timing belts, tend to wear and effectively lengthen over time. The wearing surfaces create a slack (i.e., a periodic gap between belt and pulley) in the belt that reduces the friction between the belt and the pulleys attached to the belt, ultimately causing the belt to slip. In addition, the lengthening of a belt or a chain can result in a loss of drive synchronization, in some instances causing the belt or chain to fall off the drive assembly altogether. Similarly, the inner cable of a Bowden cable often loses tension over time with respect to the hollow outer cable due to wear of the surfaces of moveable components to which it actuates. This creates a "gap" between the original position of the inner cable and the worn position, which reduces the linear movement of the inner cable when the cable is actuated. Retightening the inner cable is usually accomplished by lengthening the hollow outer cable by turning a stop-nut on the threaded end of the outer cable.

Accordingly, there remains a continued need for an improved system and method for the automatic adjustment of pedestals in a raised flooring assembly. In addition, there remains a continued need for a low-cost system and method for the automatic adjustment and/or prevention of gaps in a variety of other devices including for example mechanical belts, chains and Bowden cable assemblies.

SUMMARY OF THE INVENTION

An automatic gap adjustor is provided. The automatic gap adjustor includes an upper cammed disk, a lower cammed disk, and a spring element between the upper and lower cammed disks. The upper cammed disk can be adapted to incrementally rotate relative to the lower cammed disk in response to an axial load across the upper and lower cammed disks. Rotation of the upper disk can drive the automatic gap adjustor along a threaded rod until the automatic gap adjustor bears against a stop or other object. In this regard, the automatic gap adjustor can automatically traverse a threaded rod to reduce or eliminate a gap along a portion thereof.

In one embodiment, the spring element includes a spring washer adapted to provide an upward biasing force against the upper cammed disk. The upper cammed disk includes a first plurality of directional cams on an upper face and a second plurality of directional cams on a lower face. The lower cammed disk includes a third plurality of directional cams on an upper face and a fourth plurality of directional cams on an undercut portion opposite the upper face. The directional cams operate to promote a stepped rotation of the upper disk relative to the lower disk in response to reciprocating axial movement of the upper disk against the spring washer.

In another embodiment, the first and second plurality of directional cams include a series of ramped cams about the periphery of the upper disk in a sawtooth configuration. In a corresponding manner, the third and fourth plurality of directional cams include a series of ramped cams arranged in a sawtooth configuration about the lower disk. Optionally, each ramped cam spans substantially the same angle and defines substantially the same pitch. Further optionally, the first and second plurality of directional cams and/or the third and fourth plurality of directional cams can be radially offset from each other. For example, the radial offset can comprise one-half of the angle spanned by each ramped cam.

In one application of the above embodiments, the automatic gap adjustor can reduce a gap in a raised flooring assembly. The raised flooring assembly can include multiple height-adjustable pedestals. Each pedestal can include a stanchion, a threaded spacer extending upwardly from the stanchion, and an internally threaded nut rotatably mounted to the threaded spacer and bearing against an upper edge of the stanchion. The automatic gap adjustor can be rotatably mounted about the threaded spacer, being interposed between the stanchion and the nut. If a gap develops between the stanchion and the automatic gap adjustor, the automatic gap adjustor will periodically deflect downwardly against the stanchion to momentarily bear the weight of persons or objects on the raised flooring assembly. In response to the momentary load across the automatic gap adjustor, the upper disk can reciprocate between the third and fourth plurality of directional cams, resulting in a rotation of the upper disk relative to the lower disk. Rotation of the upper disk can drive the nut in a tightening direction to incrementally lower the automatic gap adjustor. Over repeated rotations, the automatic gap adjustor can become flush with the stanchion upper edge, constraining further axial travel of the automatic gap adjustor along the threaded spacer.

Optionally, each pedestal of a raised flooring assembly can include an automatic gap adjustor, while in other applications fewer than each pedestal can include an automatic gap adjustor. For example, every other pedestal in a row of pedestals can include an automatic adjustor, such that each floor panel is supported by no more than one pedestal having an automatic gap adjustor. During installation of a raised flooring assembly, or during maintenance of an existing raised flooring assembly, a threaded spacer with a nut and an automatic gap adjustor can be slideably received over a desired stanchion. The automatic gap adjustors can remain installed within the raised flooring assembly throughout its useful life, automatically responding to gaps along the threaded spacer without requiring a manual inspection and adjustment of the pedestals.

Further optionally, the upper disk can include a series of upper axial guides to limit rotation of the internally threaded nut relative to the upper disk. Alternatively, the internally threaded nut may be integrally joined to the upper disk. In this configuration, the upper disk can include an upward extending hexagonal boss having an internally threaded bore. In addition, the lower disk can include a series of lower axial guides to limit rotation of the lower disk relative to the stanchion. For example, the axial guides can include spaced apart flanges to telescopically receive an upper portion of the stanchion therebetween. In some embodiments, the upper and lower disks can be injection molded of acetyl resin or nylon for example, while in other embodiments the upper and lower disks can be formed from metal in an investment casting process, for example.

In another application of the above embodiments, the automatic gap adjustor is adapted to reduce slack in a belt or chain assembly. For example, a suitable belt assembly includes a belt trained about first and second spaced apart pulleys. The first pulley is driven by a motor to drive the belt and consequently the second pulley. A belt tensioner including the automatic gap adjustor selectively urges the first and second pulleys apart to take up slack in the belt. The belt tensioner includes automatic gap adjustor, a nut and an externally threaded spacer received within a truncated stanchion to bias the first pulley away from the second pulley. Tightening of the nut about the threaded spacer acts to pivot the first pulley away from the second pulley. If a gap develops between the automatic gap adjustor and the stanchion, the automatic gap adjustor will deflect downwardly against the stanchion upon initiation of the motor. In response to a momentary load across the automatic gap adjustor, the upper disk can rotate relative to the lower disk to incrementally raise the threaded spacer from within the stanchion. Over repeated activations of the motor, the slack can be taken up and the automatic gap adjustor can come to rest in a position flush with the stanchion upper edge. The automatic gap adjustor can be utilized across a variety of related applications to automatically take up slack in belt or chain assemblies, including conveyor assemblies, automobile timing belts, and V-belts, and other systems having pulleys or sprockets.

In still another application of the above embodiments, the automatic gap adjustor is used in combination with a cable assembly, for example a Bowden cable assembly. A suitable cable assembly can include an inner cable that reciprocates within an outer sleeve. The automatic gap adjustor can be mounted over a gap between bifurcated portions of the outer sleeve to lengthen or shorten the outer sleeve. Because the cable is prevented from fully retracting into the outer sleeve, lengthening the outer sleeve operates to load the cable in tension. For example, the upper disk of the automatic gap adjustor can be rotatably mounted about a threaded extension of one portion of the outer sleeve, and the lower disk of the automatic gap adjustor can be fixedly mounted to a hexagonal extension of the remaining portion of the outer sleeve. Reciprocation of the cable within the bifurcated outer sleeve drives the lower disk against the upper disk, creating a momentary axial compression across the automatic gap adjustor. The automatic gap adjustor can respond to the momentary axial compression by incrementally lengthening the outer sleeve, thereby loading the inner cable in tension. The automatic gap adjustor can be utilized across a variety of applications to automatically tension a cable, including clutch assemblies, emergency brake assemblies, bicycle brakes and gearing assemblies and other applications.

Embodiments of the invention can therefore provide a durable and low-cost mechanism to incrementally reduce a gap in response to a periodic axial load. In particular, embodiments of the invention can incrementally reduce a gap along a threaded support, including for example a rod, cable, beam or other threaded device. Advantageously, the automatic gap adjustor can automatically correct subsequent gaps as they develop. In one application, the automatic gap adjustor can utilize the weight of persons or objects moving across a raised flooring assembly to reduce and/or prevent gaps in height-adjustable pedestals. The automatic gap adjustor can be adapted for use in combination with a variety of other devices, including for example belt/chain tensioners and cables used in automobile assemblies.

These and other advantages and features of the invention will be more fully understood and appreciated by reference to the description of the current embodiments and the drawings.

DESCRIPTION OF THE CURRENT EMBODIMENTS

Figure 1:
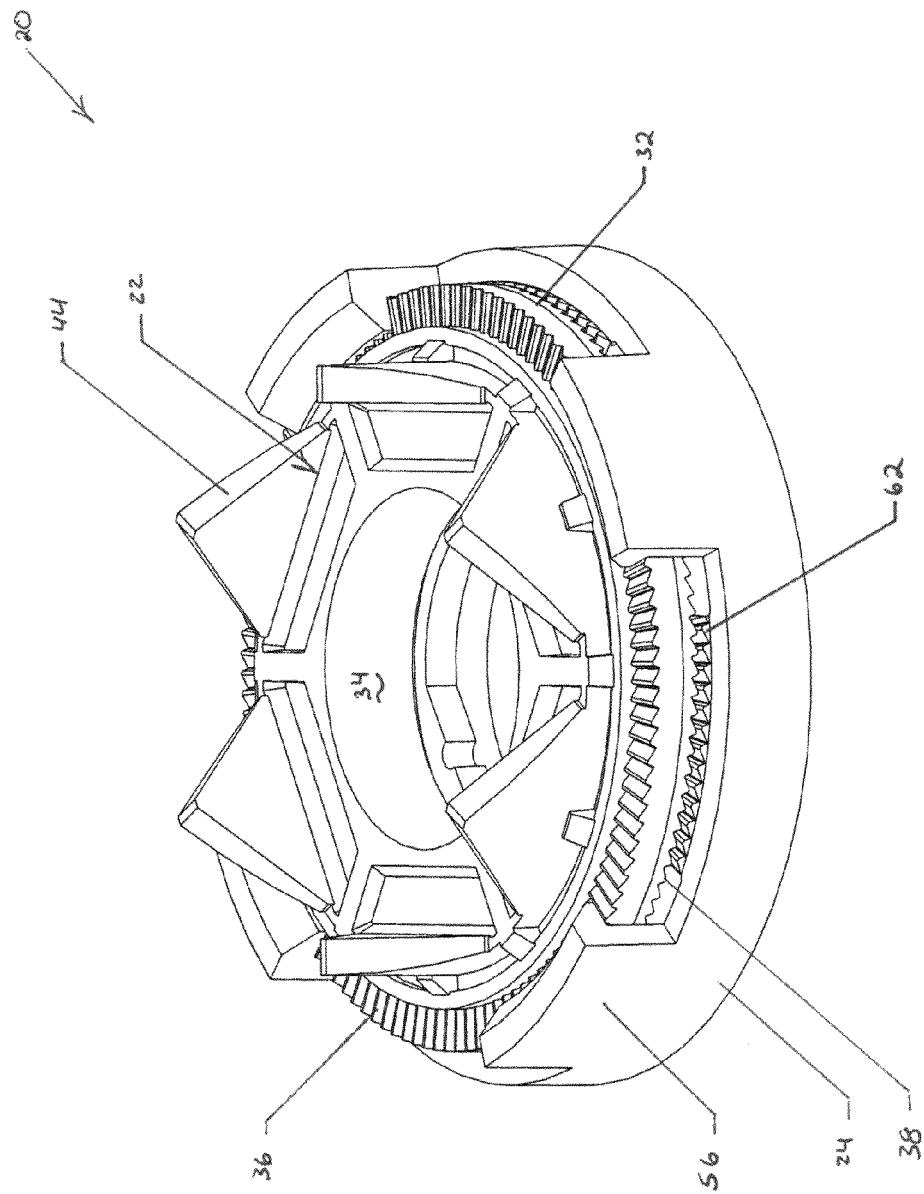
FIG. 1 is a top perspective view of an automatic gap adjustor in accordance with an embodiment of the invention.

The current embodiments relate to an automatic gap adjustor adapted to incrementally reduce a gap in response to an axial load. In particular, the current embodiments relate to an automatic gap adjustor adapted to incrementally reduce a gap along a threaded support, and further adapted to maintain a minimum acceptable gap. As explained in Parts I-III below, the automatic gap adjustor can be applied in a variety of applications to reduce and/or maintain minimum gaps in a variety of devices, including for example height adjustable pedestals (Part I), belt/chain tensioners (Part II) and cabling systems (Part III).

An automatic gap adjustor is illustrated in FIGS. 1-6 in accordance with one embodiment and generally designated 20. The adjuster 20 generally includes an upper cammed disk (or rotatable adjustor) 22, a lower cammed disk (or adjustor support) 24, and a spring element 26 interposed between the upper and lower disks 22, 24. As explained below, the upper cammed disk 22 can be adapted to incrementally rotate relative to the lower cammed disk 24 in response to an axial load across the upper and lower cammed disks 22, 24.

Figure 3:
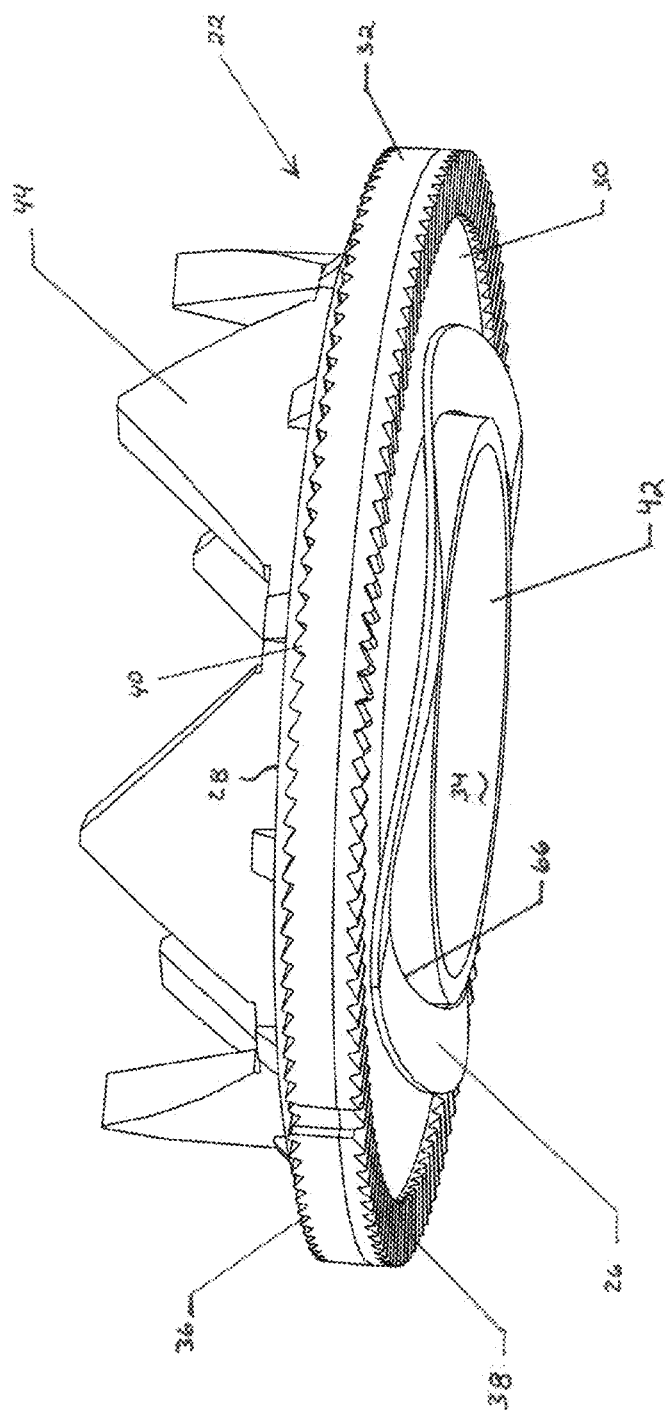
FIG. 3 is a side perspective view illustrating the upper cammed disk and the spring element of the automatic gap adjustor of FIG. 1.

As perhaps best shown in FIG. 3, the upper cammed disk 22 can include an upper axial face 28 opposite a lower axial face 30. The upper and lower axial faces 28, 30 are interconnected by an outer radial sidewall 32 spaced apart from an inner radial sidewall 34. The upper and lower axial faces 28, 30 include respective first and second axial cam segment patterns 36, 38. For example, the first cam segment pattern 36 can include "n" number of directional cams each having a ramped surface extending axially from the upper face 28. In other words, the first cam segment pattern 36 can include "n" number of ramped teeth 40 extending around the outer periphery of the upper face 28 in a sawtooth configuration. In the illustrated embodiment, the first cam segment pattern 36 includes 144 ramped teeth 40, while in other embodiments greater or fewer numbers of ramped teeth 40 can be utilized, including for example 90 teeth in some embodiments. In like manner, the second cam segment pattern 38 can include "n" number of ramped teeth 40 extending around the outer periphery of the lower face 30 in a sawtooth configuration. Each ramped tooth 40 extending from the upper disk 22 can span substantially the same angle and can define substantially the same pitch or cam angle. For example, in the illustrated embodiment each ramped tooth spans 2.5 degrees and includes a 25 degree cam angle, while in other embodiments each ramped tooth spans 4 degrees and includes a 30 degree cam angle. As also optionally shown in FIG. 3, orientation of the second cam segment pattern 38 can be radially offset from the first cam segment pattern 36. For example, the radial offset can be approximately equal to one and one quarter degrees, or more generally one-half of the two and one-half degree angular span of each ramped tooth 40, while other offsets may also be utilized.

Figure 4:
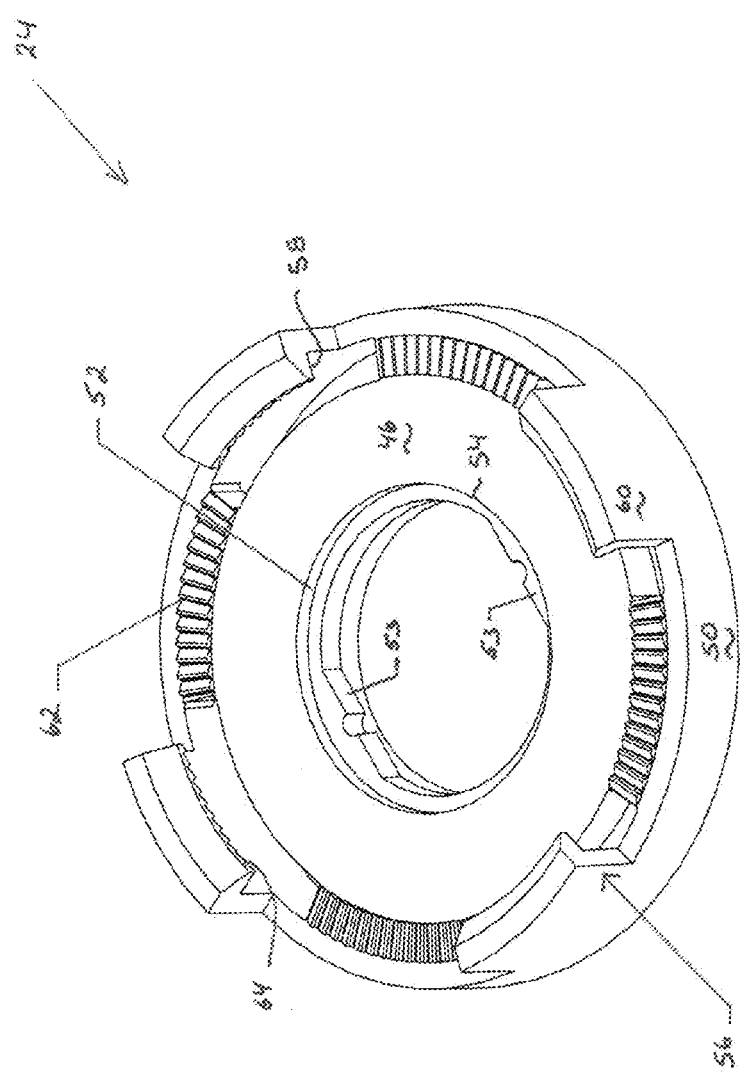
FIG. 4 is a top perspective view illustrating the lower cammed disk of the automatic gap adjustor of FIG. 1.
Figure 5:
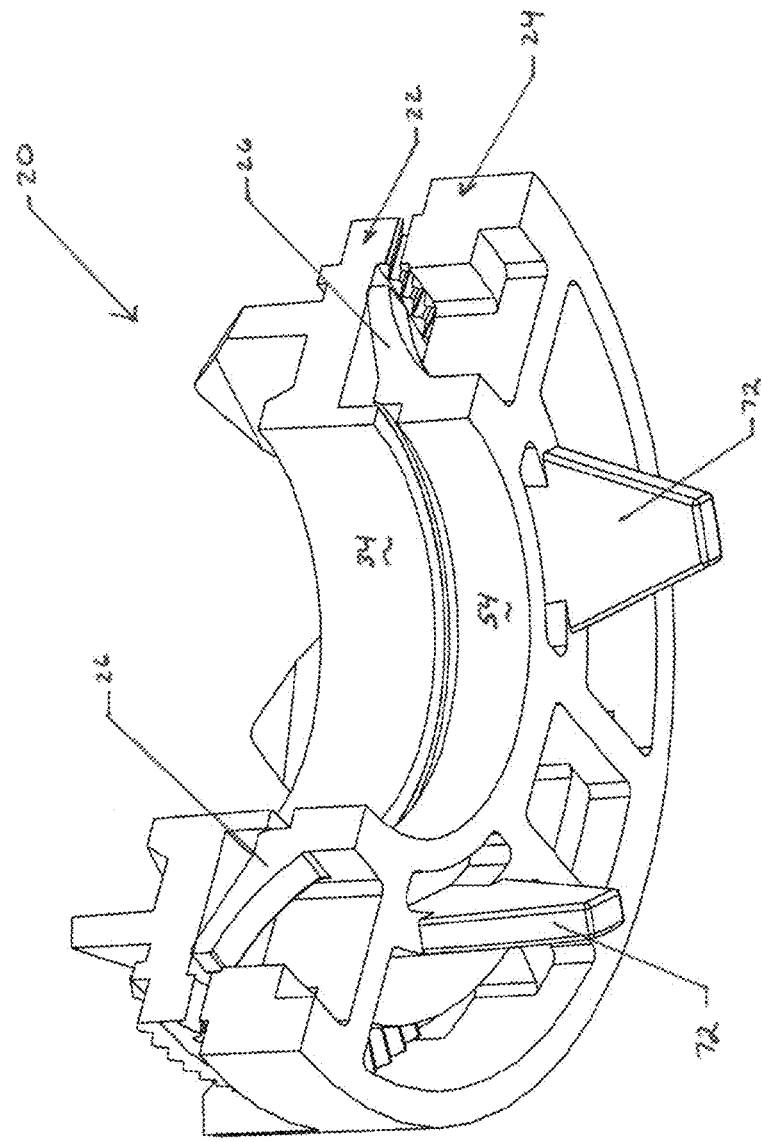
FIG. 5 is a sectioned perspective view of an automatic gap adjustor illustrating integral spring arms.
Figure 6:
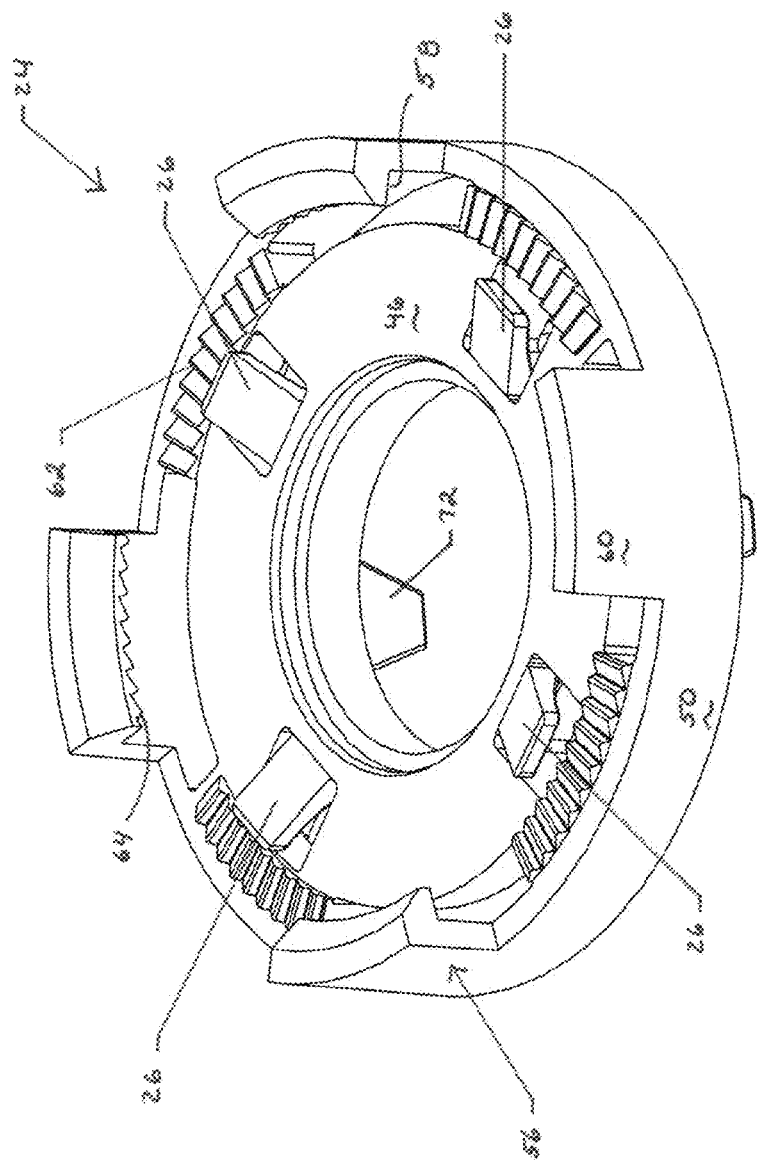
FIG. 6 is a top perspective view of a lower cammed disk illustrating the integral spring arms of the automatic gap adjustor of FIG. 5.
Figure 7:
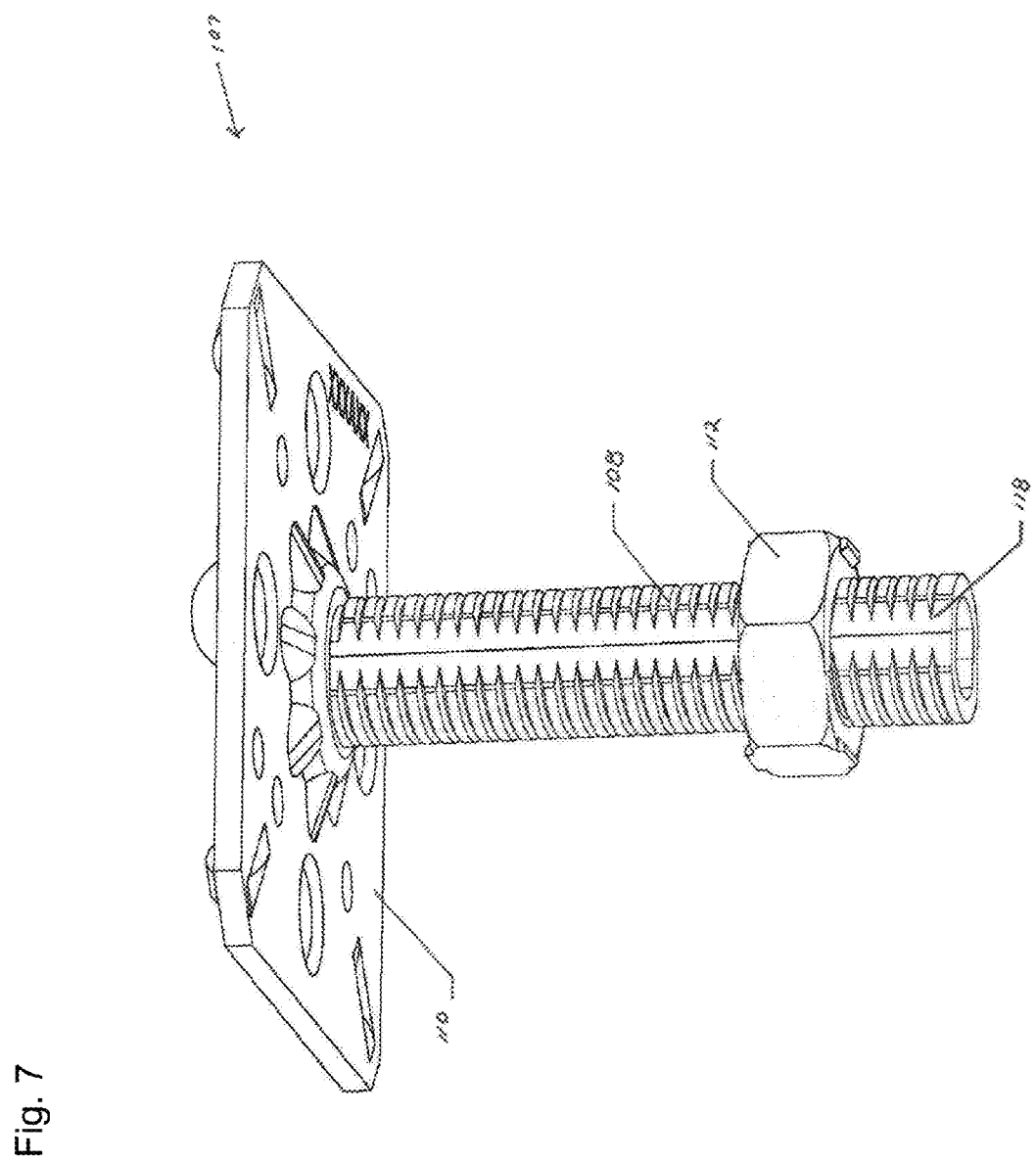
FIG. 7 is a perspective view of a height adjustable support assembly for a raised flooring assembly.

Referring now to FIG. 4, the lower disk 24 can include an upper face 46 opposite a lower face 48. The upper and lower faces 46, 48 are interconnected by an outer radial sidewall 50 spaced apart from an inner radial sidewall 52. The inner radial sidewall 52 can define an aperture 54 sized to allow axial movement of a threaded support therethrough. The aperture 52 can include opposing radial flanges 53 that are shaped to correspond to flat portions 118 on a threaded support 108 to prevent relative rotation therebetween. The upper face 46 can further include one or more axial clips 56 having an axial undercut 58 opposite the upper face 46 of the lower disk 24. These clips 56 can generally include a cantilevered arm 60 adapted to momentarily deflect to receive of the upper disk 22 as shown in FIG. 1. While in the illustrated embodiment the lower disk 24 includes four clips 56 equidistant from each other about the periphery of the upper axial face 46, more or fewer clips 56 can be utilized as desired.

As also shown in FIG. 4, the lower disk 24 can include a third cam segment pattern 62 extending upwardly about at least a portion of the periphery of the upper face 46 to engage the second cam segment pattern 38 on the underside of the upper disk 22. The third cam segment pattern 62 can include multiple directional cams 40 having a ramped surface, whereby rotation of the upper disk 22 is provided in a first direction (e.g., clockwise) but not in a second direction (e.g., counter-clockwise) relative to the lower disk 24. As noted above, each clip 56 includes an undercut 58 opposite the upper face 46. The undercut 58 can include a fourth cam segment pattern 64 extending axially downward to engage the first cam segment pattern 36 on the upper face 28 of the upper disk 22. The fourth cam segment pattern 64 can include multiple directional cams 40 having a ramped surface, whereby rotation of the upper disk 22 is provided in the first direction (e.g., clockwise) but not in the second direction (e.g., counter-clockwise) relative to the lower disk 24.

The third cam segment pattern 62 can be radially offset from the fourth cam segment pattern 64, such that the third cam segment pattern 62 is not a mirror opposite of the fourth cam segment pattern 64. For example, the third cam segment pattern 62 can be radially offset from the fourth cam segment pattern 64 by approximately half of the span of each ramped tooth 40. If each ramped tooth 40 spans one degree, the third and fourth cam segment patterns 62, 64 can be offset from each other by approximately one-half of one degree. In the illustrated embodiment, for example, each ramped tooth 40 spans 2.5 degrees, for an offset of 1.25 degrees, while in other embodiments each ramped tooth 40 spans 4 degrees, for an offset of 2 degrees. Optionally, only the first and second cam segment patterns 36, 38 can be radially offset from each other, and the third and fourth cam segment patterns 62, 64 can be minor opposites of each other. Further optionally, only the third and fourth cam segment patterns 62, 64 can be radially offset from each other, and the first and second cam segment patterns 36, 38 can be mirror opposites of each other.

Figure 2:
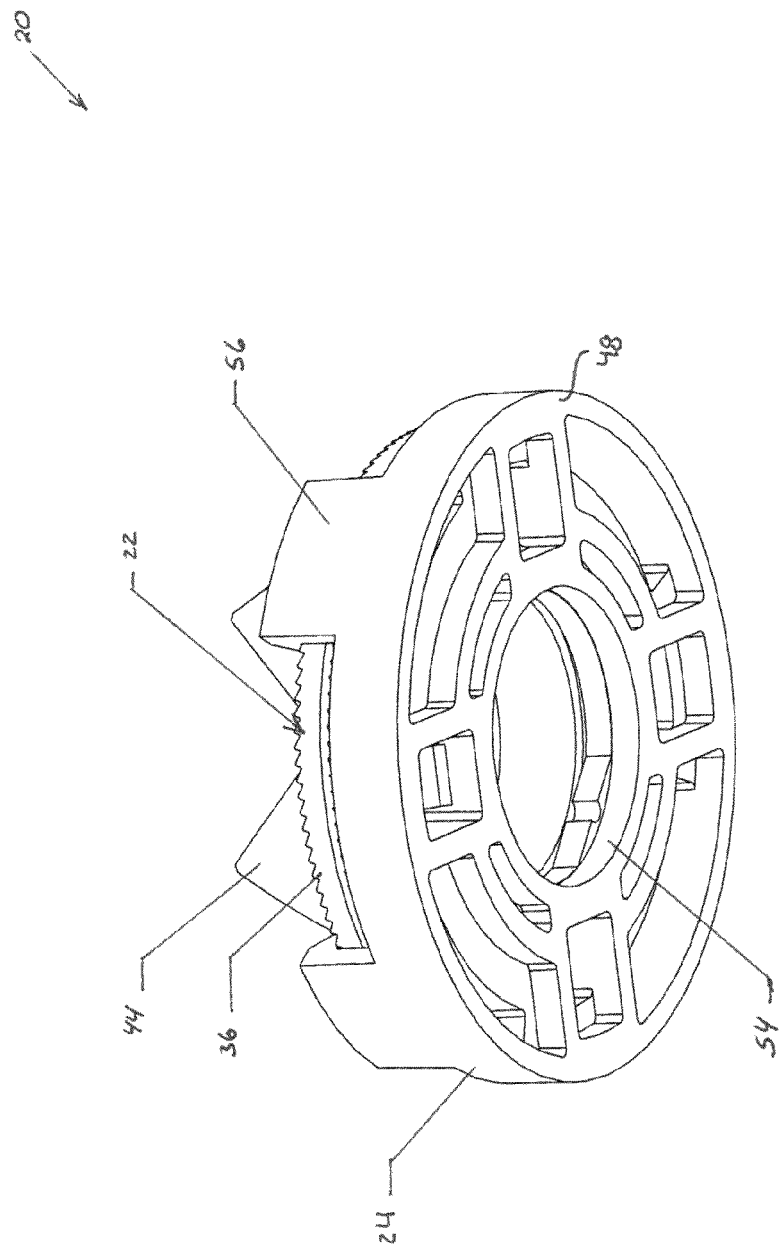
FIG. 2 is a bottom perspective view of the automatic gap adjustor of FIG. 1.

In some embodiments, the ramped teeth 40 can span the entire circumference of the lower disk upper axial face 46, while in other embodiments, one or more ramped teeth 40 can be omitted along the lower disk upper axial face 46. In like manner, one or more of the ramped teeth 40 can be omitted from the underside of each undercut 58. In addition, ramped teeth 40 can span the entire circumference of the upper and lower axial faces 28, 30 as shown in FIGS. 1-3, while in other embodiments one or more ramped teeth 40 are omitted along the upper and/or lower axial faces 28, 30 of the upper disk 22.

In each of the above configurations, the distance between the cammed undercut 58 and the cammed upper face 46 is such that reciprocal axial movement of the upper disk 22 between the cammed undercut 58 and the cammed upper face 46 can result in rotation of the upper disk 22 in a first direction about a threaded support.

As noted above, the automatic adjuster 20 includes a spring element 26 interposed between the upper and lower disks 22, 24 to promote movement of the upper disk 22 away from the lower disk 24. The spring element 26 can be any resilient device adapted to deflect under an axial load. As shown in FIG. 3 for example, the spring element 26 includes a spring washer, such as a wave washer or a Belleville washer. The spring washer can include an aperture 66 sized to accommodate the passage of the threaded support therethrough, being interposed between the upper and lower disks 22, 24 radially inward from the directional cam segments 40. As alternatively shown in FIGS. 5-6, the spring element 26 can include upward extending resilient flanges or "spring arms" integrally formed with the lower disk 24. The spring arms 26 can be spaced equidistant from each other, being positioned radially inward from the directional cam segments 40 and radially outward of the lower disk aperture 52. Further optionally, the spring element can include a compression spring. In these and other configurations, the spring element or elements 26 urge the first cam segment pattern 36 into registration with the fourth cam segment pattern 64, while also deflecting downwardly to permit movement of the second cam segment pattern 38 into registration with the third cam segment pattern 62 under the influence of an axial load across the adjustor 20.

I. Height Adjustable Pedestals

In one application, the automatic gap adjustor 20 can be utilized to close a gap on a height adjustable pedestal for a raised flooring assembly. With reference to FIGS. 7-18, an exemplary raised flooring assembly 100 is illustrated in combination with the automatic gap adjustor described above. More specifically, the automatic gap adjustor 20 can be utilized in conjunction with a raised flooring assembly 100 including multiple pedestals 102 for adjustably supporting multiple raised floor panels 104. Each pedestal 102 can generally include a stationary stanchion 106 and a height adjustable support assembly 107 extending upwardly from the stanchion 106. The adjustable support assembly 107 can include an externally threaded spacer 108, a corner bracket 110 secured to and supported by the threaded spacer 108, and an internally threaded nut 112 to selectively raise or lower the threaded spacer 108 from within the stanchion 106. Each panel 104 straddles four corner brackets 110, with each corner bracket 110 generally supporting a corresponding number of raised panels 104.

To facilitate adjustment of one or more pedestals 102, an automatic height adjustable support assembly 109 is provided, including an externally threaded spacer 108, a corner bracket 110 secured to and supported by the threaded spacer 108, an internally threaded nut 112 and an automatic gap adjustor 20 to selective raise or lower the threaded spacer 108 from within the stanchion 106. The upper disk 22 of the automatic gap adjustor 20 is adapted to be rotatably mounted about the threaded spacer 108. In particular, the upper disk 22 is adapted to receive the internally threaded nut 112 to prevent relative rotation therebetween. The radial flanges 53 of the gap adjustor lower disk 24 engage flattened sides 118 of the threaded spacer 108 to prevent relative rotation therebetween. An axial compression of the adjustor 20 against the upper edge of the stanchion can promote rotation of the upper disk 22 relative to the lower disk 24, and consequently rotation of the nut 22 about the threaded spacer 108, in the manner set forth above in connection with FIGS. 1-4. As the nut 112 rotates about the threaded spacer 108, the nut 112 lowers relative to the stanchion 106 until the automatic gap adjustor 20 bears against the upper edge of the stanchion 106. When the automatic gap adjustor 20 bears against the upper edge of the stanchion 106, further axial travel along the threaded spacer 108 is constrained by compressing the spring element 26 between the upper and lower disks 22, 24 to prevent further rotation of the automatic gap adjustor 20.

Figure 8:
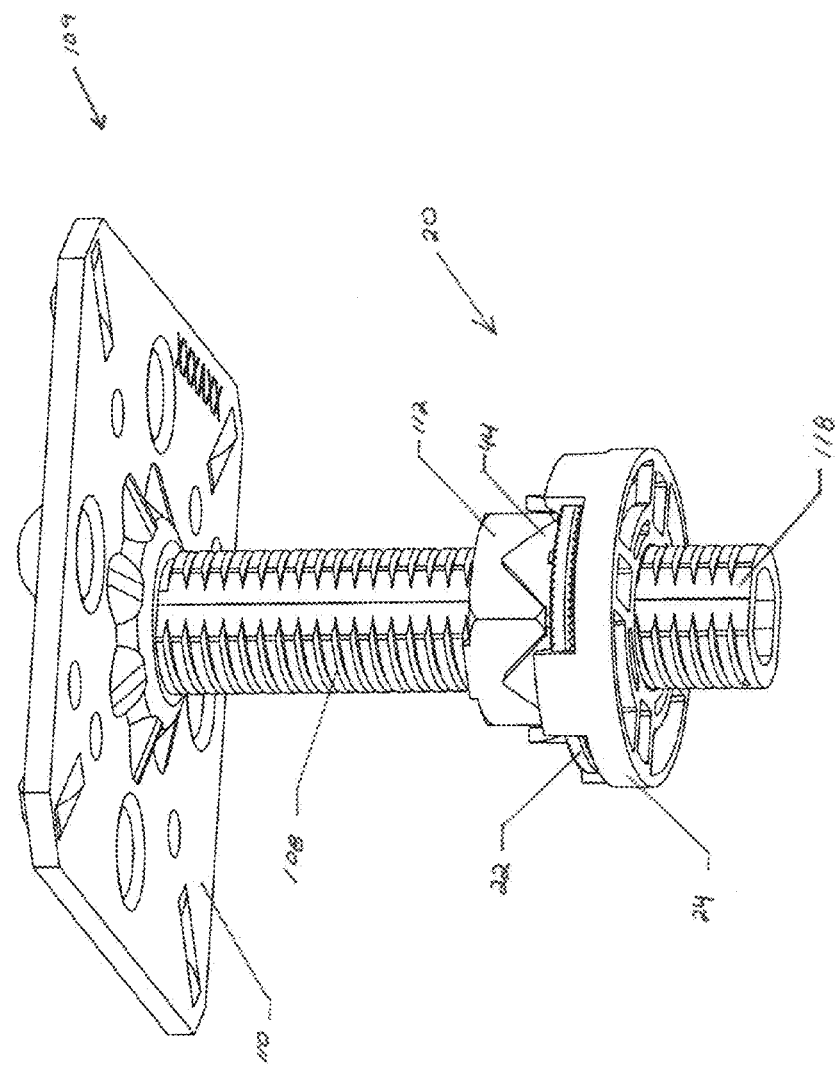
FIG. 8 is a perspective view of an automatic height adjustable support assembly including the automatic gap adjustor of FIG. 1.
Figure 9:
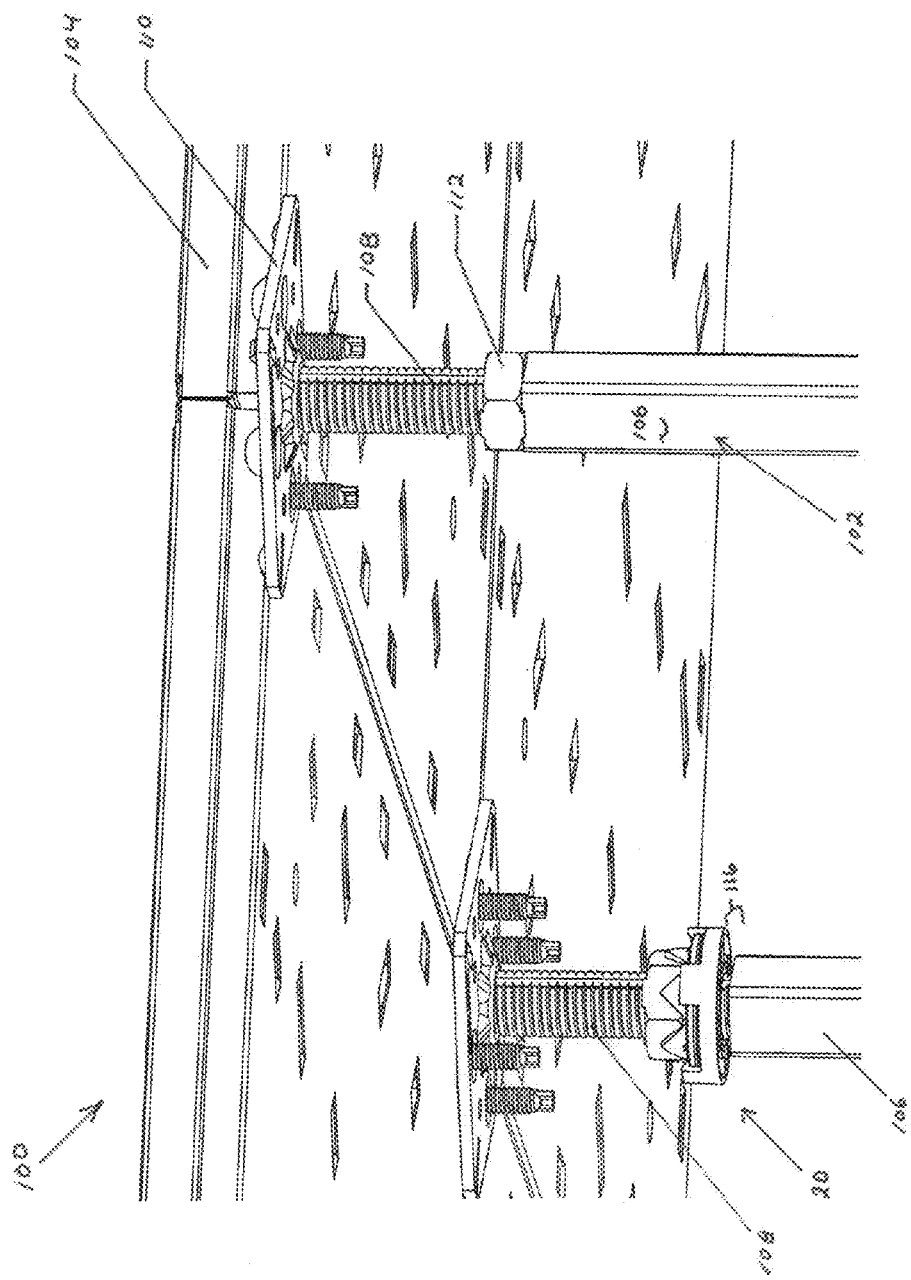
FIG. 9 is a perspective view of a raised flooring assembly including the height adjustable raised flooring assembly of FIG. 7 and the automatic height adjustable raised flooring assembly of FIG. 8.

Operation of the gap adjustor can be further understood with reference to FIGS. 7-11. During installation or maintenance of the flooring assembly 100, selective rotation of the nut 112 can raise or lower the threaded spacer 108 from within the stanchion 106 to give the pedestal 102 the desired height. As shown in FIG. 9 at right, substantially no gap is present when the nut 112 bears against the upper edge of the stanchion 106. As shown in FIG. 9 at left, however, the stanchion 106 can recede from the threaded spacer 108, resulting in a gap 116 in the region between the nut 108 (or automatic gap adjustor 20) and the stanchion 106. Such a condition can cause an undesirable knocking sound as persons or objects move across the affected floor panel 104, potentially presenting a tripping hazard as adjacent panels create a depression or a step. To correct this instability, the automatic gap adjustor 20 can respond to each application of an axial load by incrementally lowering the threaded nut 112 on to the upper edge of the stanchion 106. For example, each time a person steps on the affected floor panel 104, the floor panel 104 deflects downwardly under the influence of the person's weight. The load borne by the floor panel 104 is then transferred downwardly to the corner bracket 110, and then through the threaded spacer 108, compressing the automatic gap adjustor 20 between the stanchion 106 and the internally threaded nut 112. In instances where the compressive force across the automatic gap adjustor 20 is sufficient to overcome the spring element 26 upward-biasing force, the nut 112 will urge the upper disk 22 downward into registration with the lower disk 24. In particular, the compressive force can urge the second plurality of cam segments 38 into registration with the third plurality of cam segments 62. Because the second plurality of cam segments 38 is initially radially offset from the third plurality of cam segments 62, the third (stationary) plurality of cam segments 62 urge the second (rotatable) plurality of cam segments 38 in a first direction about the threaded spacer 108. Optionally, this rotation of the upper disk 22 is approximately equal to one-half of the angular span of each cam segment 40, or one-half of one degree in the present embodiment. Further optionally, this rotation of the upper disk 22 is in the clockwise direction when viewed from above.

As the axial compression diminishes, for example as the person moves across the affected floor panel 104 to an adjacent floor panel, the spring element 26 upward biasing force can urge the upper disk 22 into registration with the undercut portion 58 of the lower disk 24. In particular, the upward biasing force can urge the first plurality of cam segments 36 into registration with the fourth plurality of cam segments 64. Because the first plurality of cam segments 36 are now radially offset from the fourth plurality of cam segments 64, having rotated 1.25 degrees in the present embodiment, the fourth (stationary) plurality of cam segments 64 urge the first (rotatable) plurality of cam segments 36 in the first direction about the threaded spacer 108. Optionally, this rotation of the upper disk 22 is again approximately equal to one-half of the angular span of each cam segment 40, or 1.25 degrees in the present embodiment. Because the nut 112 is rotatably driven by the upper disk 22, the resulting rotation of the nut 122 in the first direction about the threaded spacer 108 can promote the extension of the threaded spacer 108 from within the stanchion 106.

With each application of a downward axial load and a corresponding upward axial spring force, the upper disk 22 rotates about the threaded spacer 108 in stepped increments relative to the lower disk 24. The stepped rotation of the upper disk 22 and nut 112 relative to the lower disk 24 and stanchion 106 can achieve an incremental lowering of the automatic gap adjustor 20, particularly as one or more objects move across the overlying affected floor panel 104 over a period of use. When the automatic gap adjustor 20 bears against the upper edge of the stanchion 106, the automatic gap adjustor 20 is generally constrained from axial travel along the threaded spacer 108. As a result, the upper and lower disks 22, 24 can be urged together, with the second plurality of cam segments 38 being engaged with the third plurality of cam segments 64. When the second and third plurality of cam segments 38, 64 are urged together or the gap between cam segments 36, 64 has been reduced to less than the height of the cam segment tooth 40 so that the opposed tooth segments cannot pass, a further axial load will not cause the upper disk 22 to rotate about the threaded spacer 108 relative to the lower disk 24. Thus, the incremental lowering of the automatic gap adjustor 20 will normally terminate after the lower face 48 of the lower disk 24 is flush with the upper edge of the stanchion 106. If the stanchion 106 again recedes from the threaded spacer 108, or if for some reason the adjacent pedestals 102 are heightened, causing the gap between cam segments 36, 64 to increase to a distance greater than the height of cam segment tooth 40 allowing the opposed tooth segments to pass, the automatic gap adjustor 20 can operate in the manner noted above to drive the automatic gap adjustor 20 into engagement with the stanchion 106.

Figure 10:
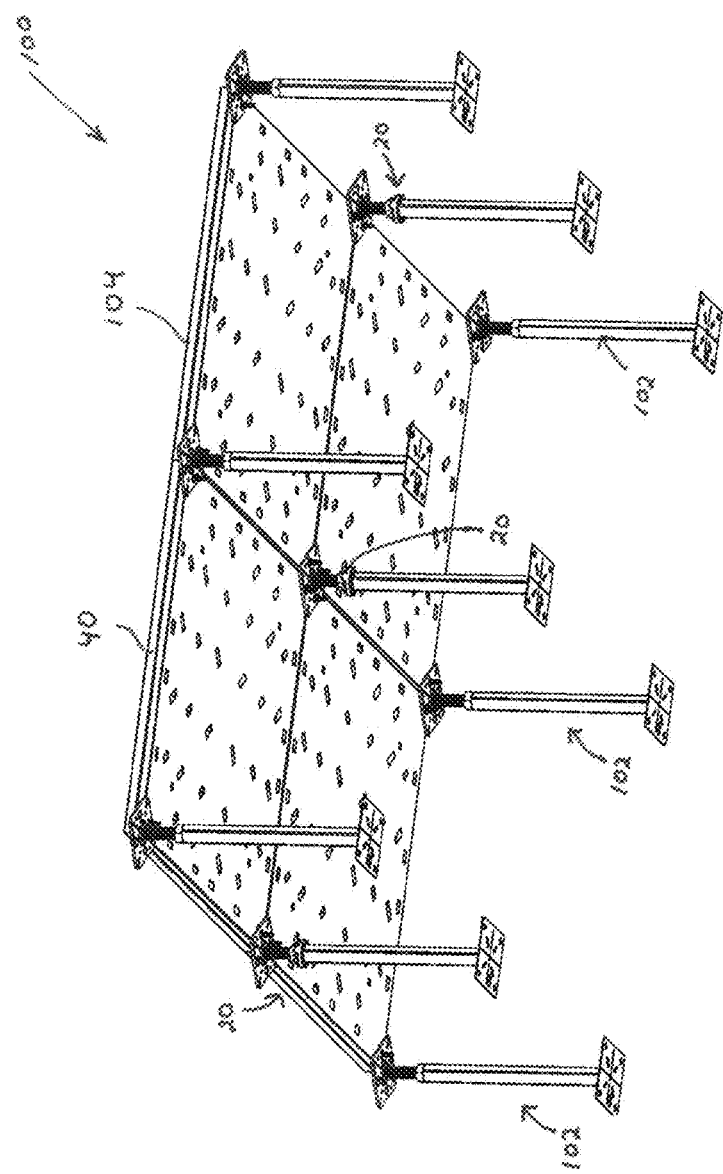
FIG. 10 is a bottom perspective view of a raised flooring assembly including multiple pedestals and multiple automatic gap adjustors.
Figure 11:
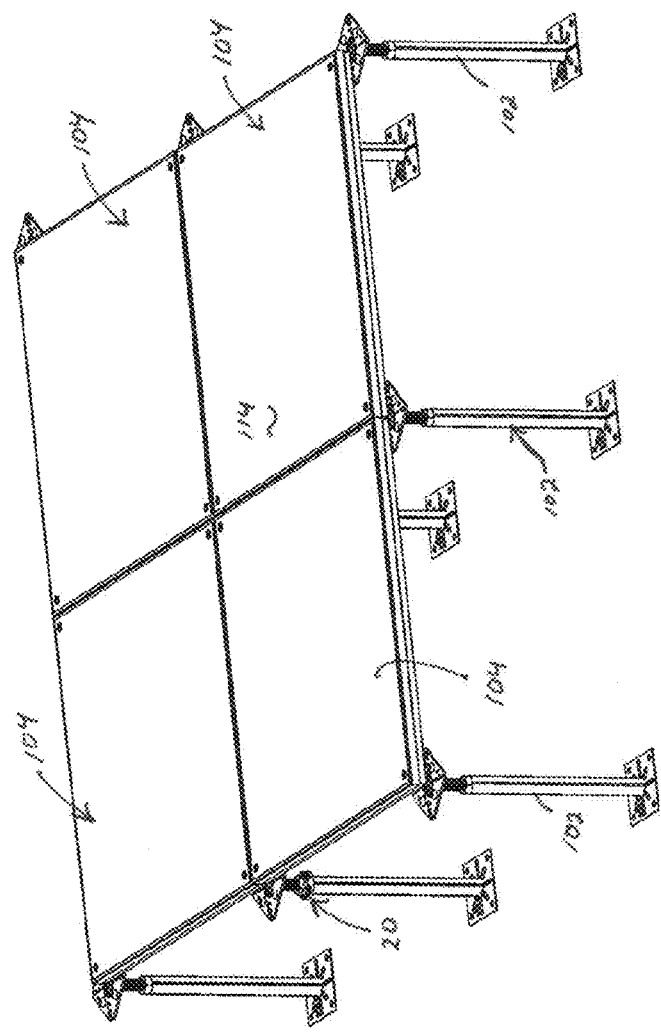
FIG. 11 is a top perspective view of the raised flooring assembly of FIG. 10.

During installation or maintenance of a raised flooring assembly 100, a height adjustor support assembly 107 can be replaced by installing an automatic height adjustor assembly 109. At least some pedestals 102, and in some instances each pedestal 102, can include an automatic height adjustor support assembly 109 as shown in FIGS. 9-10. In some embodiments, alternating pedestals 102 can include an automatic height adjustor support assembly 109, while in other embodiments each pedestal 102 can include an automatic height adjustor support assembly 109. In substantially the same manner as described above, each nut 112 can be selectively rotated to facilitate horizontal alignment of the elevated flooring panels 104 to achieve a level surface 114 as shown in FIG. 11.

Figure 12:
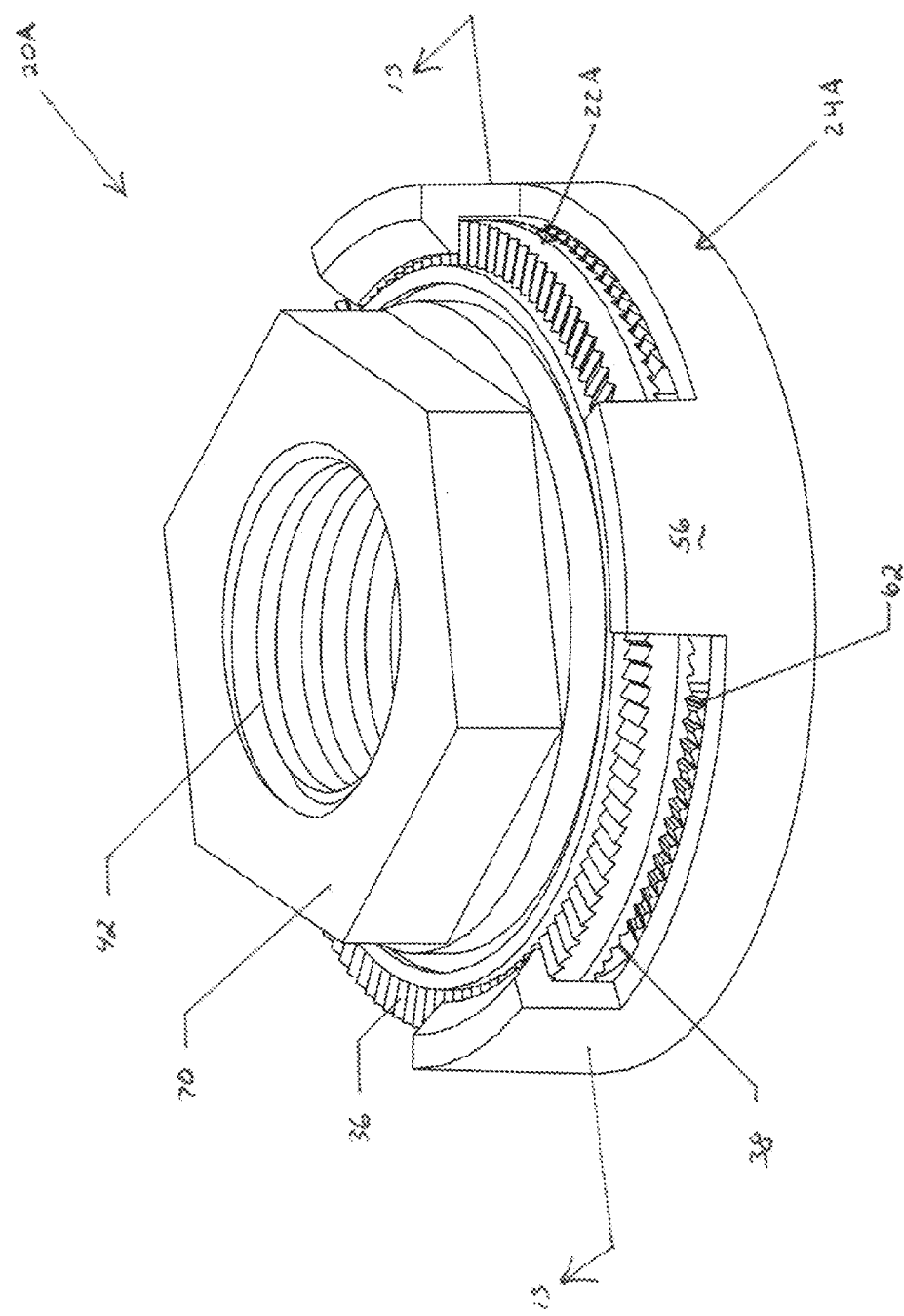
FIG. 12 is a perspective view of an automatic gap adjustor illustrating an internally threaded nut integrally formed with the upper cammed disk.
Figure 13:
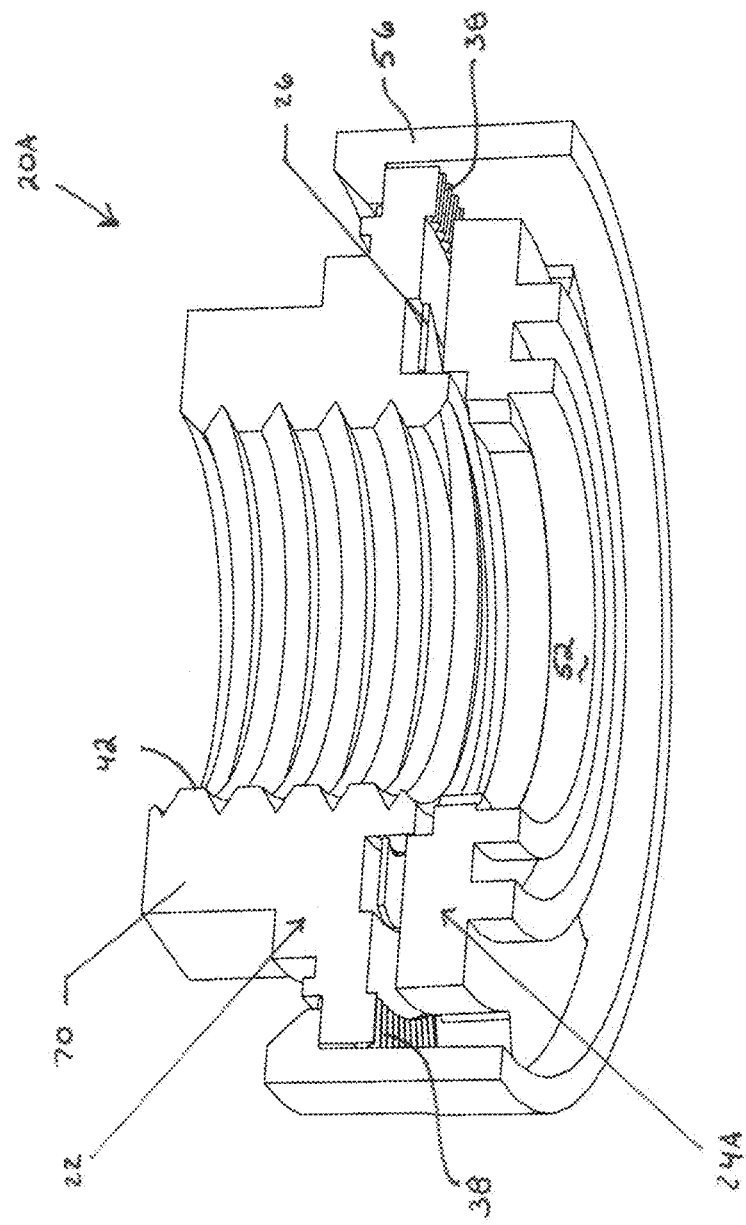
FIG. 13 is a vertical cross-sectional view of the automatic gap adjustor of FIG. 12 taken along line 13-13.
Figure 14:
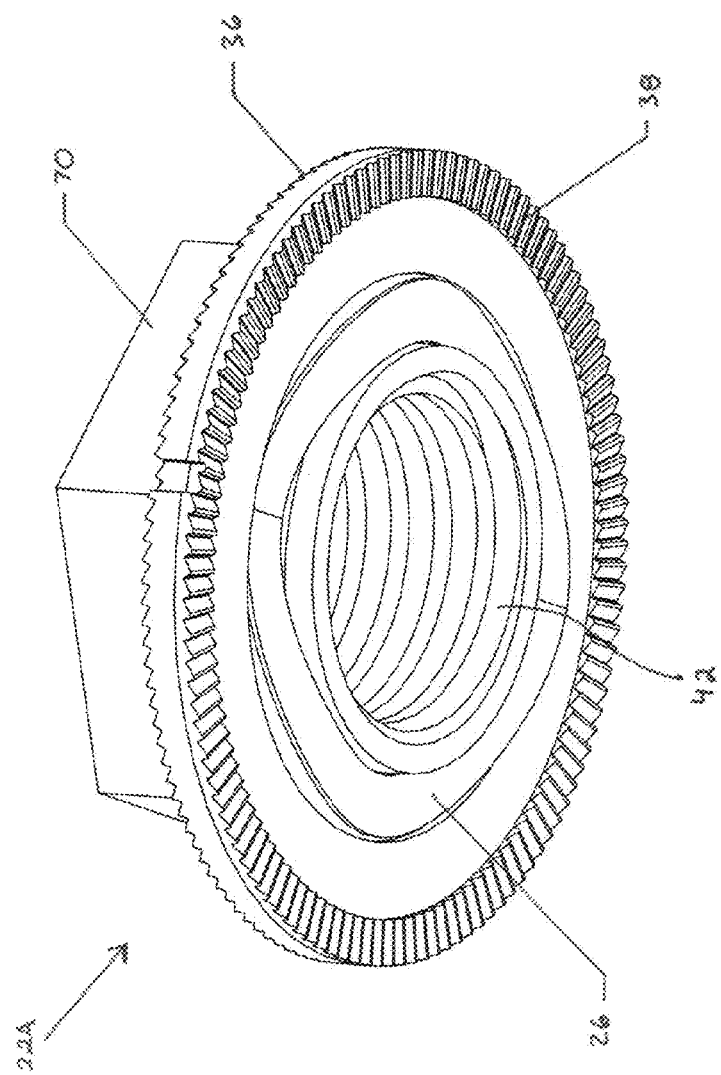
FIG. 14 is a bottom perspective view of the upper cammed disk and spring element of FIG. 12.
Figure 15:
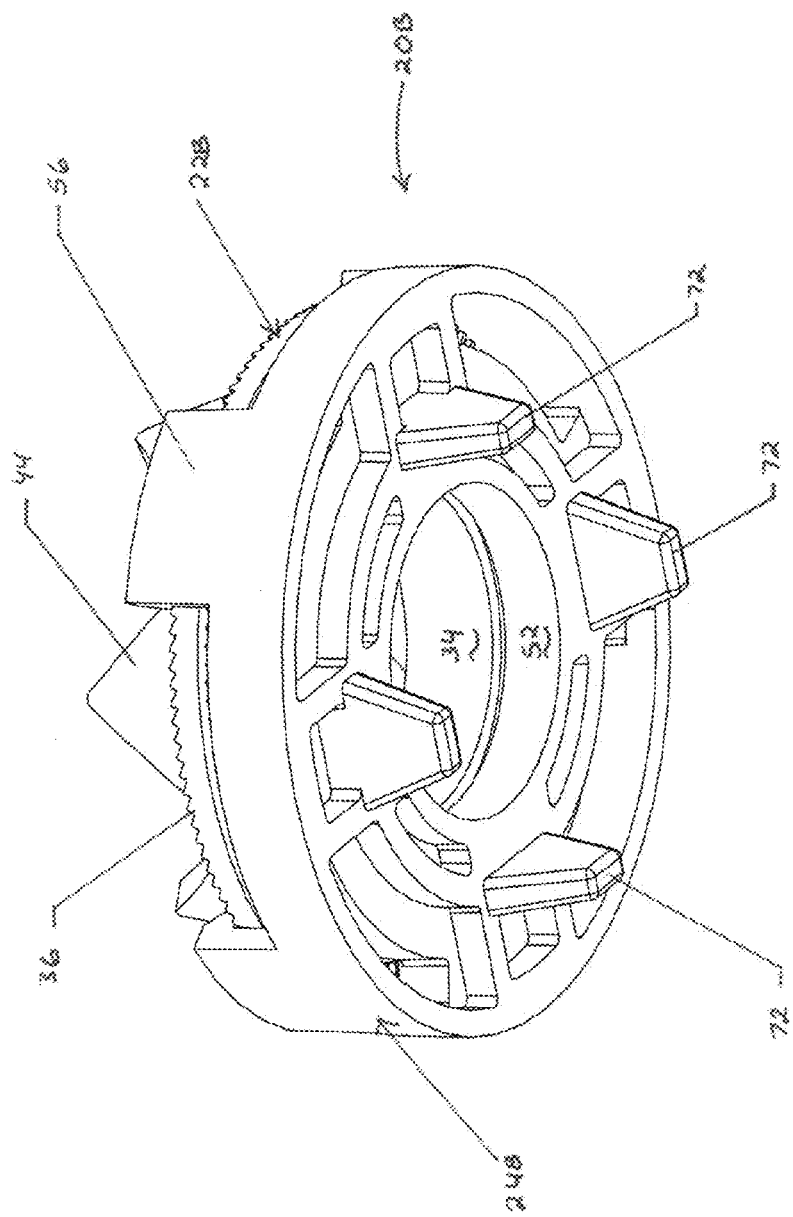
FIG. 15 is a side perspective view of an automatic gap adjustor illustrating optional axial members extending downwardly from the lower cammed disk of FIG. 1.
Figure 16:
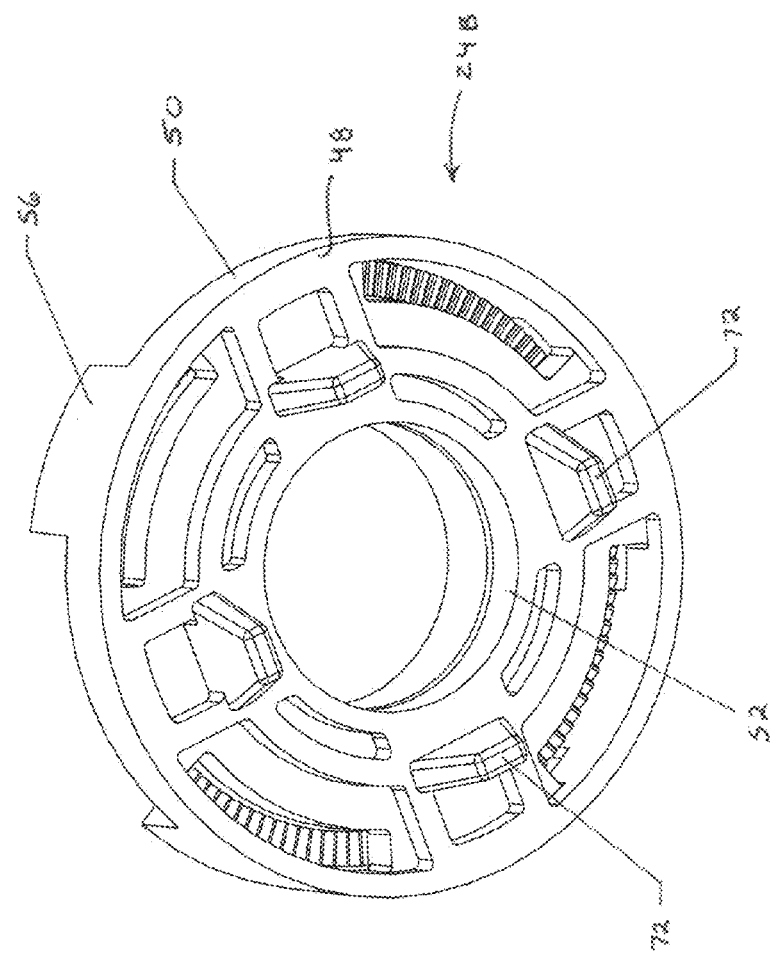
FIG. 16 is a bottom perspective view of the automatic gap adjustor of FIG. 15.
Figure 17:
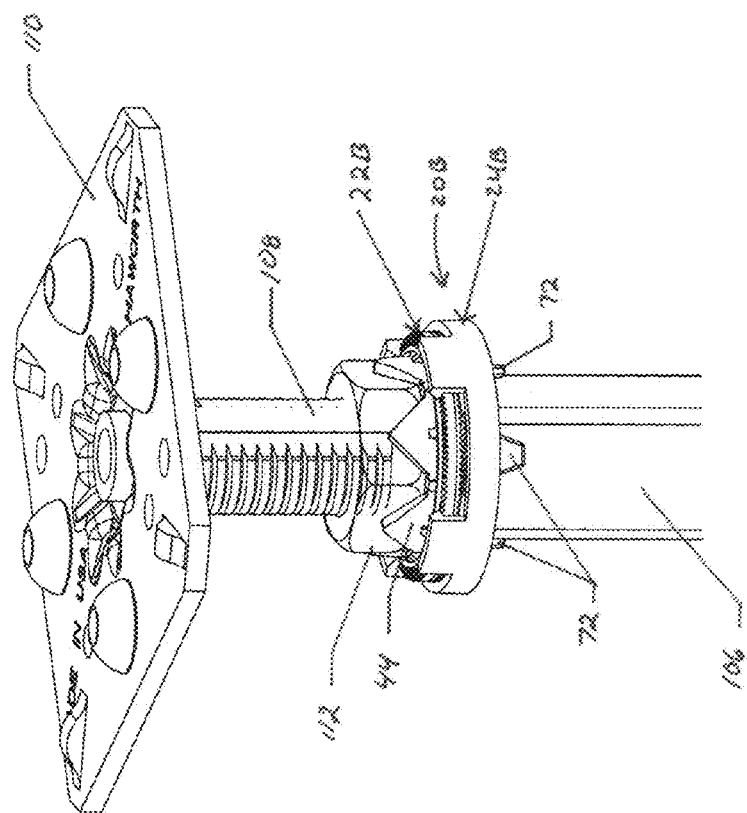
FIG. 17 is a side perspective view of a pedestal for a raised flooring assembly including the automatic gap adjustor of FIG. 15.
Figure 18:
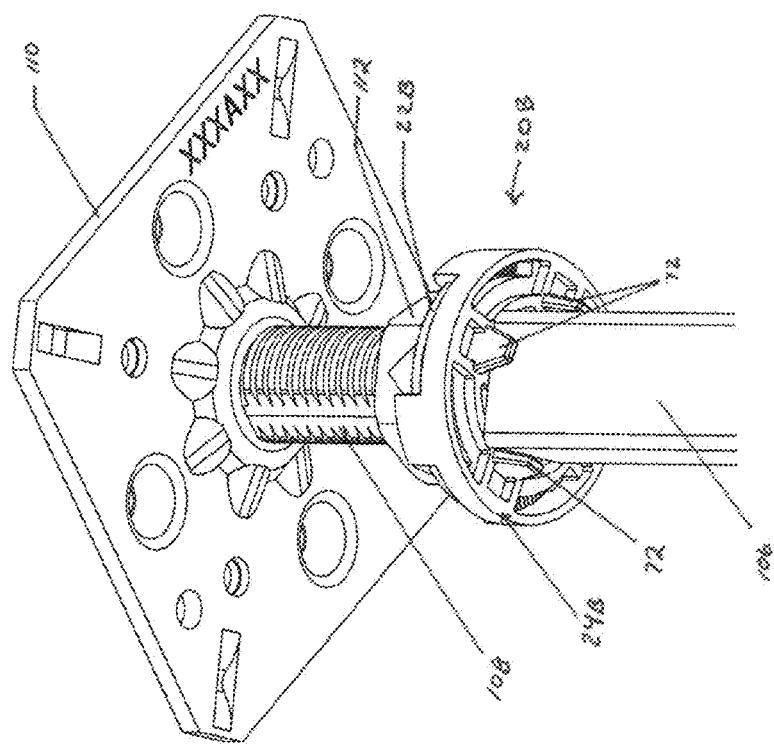
FIG. 18 is a bottom perspective view of a pedestal for a raised flooring assembly including the automatic gap adjustor of FIG. 15.

While the automatic gap adjustor 20 is described above as being separate from the internally threaded nut 112, in some embodiments the automatic gap adjustor 20 and the nut 112 can be integrally joined to each other. As shown in FIGS. 12-14 for example, an automatic gap adjustor 20A is structurally and functionally similar to the above automatic gap adjustor 20 noted above, but includes a hexagonal boss 70 protruding upwardly from the upper disk 22A for drivable engagement by a suitable implement. The hexagonal boss 70 further includes an internally threaded bore 42 for engagement with the threaded spacer 108. In this configuration, the upper disk 22A does not include the one or more upper axial guides 44 noted above in connection with FIG. 3. In addition, the lower disk 24A can optionally include one or more lower axial guides 72 extending downwardly from the automatic gap adjustor 20A, potentially in place of the flat wall portions or radial flanges 53 noted above in connection with FIG. 4. As shown in FIGS. 15-18 for example, the axial guides 72 can catch the stanchion 106 as the automatic gap adjustor 20B is driven downwardly. For example, the axial guides 72 can include spaced apart flanges to telescopically receive an upper portion of the stanchion 106 therebetween. In this regard, the lower disk 24B is fixed in relation to the stanchion 106 to thereby prevent relative rotational movement therebetween. In operation, reciprocal axial movement of the upper disk 22B can impart a rotation of the upper disk 22B—and thus the nut 112 or boss 70—relative to the lower disk 24B. Because the lower disk 24a does not rotate about the stanchion 106, the upper disk 22B can incrementally screw the nut 112 or boss 70 further down the threaded spacer 108. Because the nut 112 or boss 70 is limited in the downward direction by the stanchion 106, rotation of the nut 112 or boss 70 results in an extension of the threaded spacer 108 from within the stanchion 106. The incremental heightening of the threaded spacer 108 will normally terminate after the corresponding pedestal 102 is returned to a height that is even with the height of adjacent pedestals in the manner set forth above.

In addition to applications involving raised flooring assemblies, the height adjustable support assembly 109 can also be utilized as an adjustable glide or leveler for a table, filing cabinet, appliance or other device. For example, the adjustable support assembly 109 as shown in FIG. 8 can be inverted and telescopically inserted into an oval-shaped recess at the bottom of a table leg. The threaded spacer 108 can include non-threaded sidewalls 118 that assist in preventing rotation of the threaded spacer 108 within the oval shaped recess and lower disk 24. Rotation of the threaded nut 112 in a direction that causes end 110 to extend away from the automatic gap adjustor 20 brings the lower disk 24 into supporting contact with the lower edge of the table leg (or other device) and brings the end 110 into supporting contact with the floor. One or more of each of the table legs can include an automatic gap adjustor 20 about the threaded spacer 108. As a gap develops between the lower disk 24 and the table leg (or between the floor and adjustable support assembly 109), the table will periodically deflect downwardly against the lower disk 24 resulting from a temporarily added downward force. In response to the temporary load across the automatic gap adjustor 20, the upper disk 22 can rotate about the threaded spacer 108 to drive the nut in a direction to incrementally increase the distance between the end 110 and disk 24 the height adjustable support assembly 109. Over repeated deflections, the lower disk 24 can become flush with the table leg, constraining further axial travel of the nut 112 along the threaded spacer 108 substantially as set forth above.

II. Belt and Chain Tensioners

Figure 19:
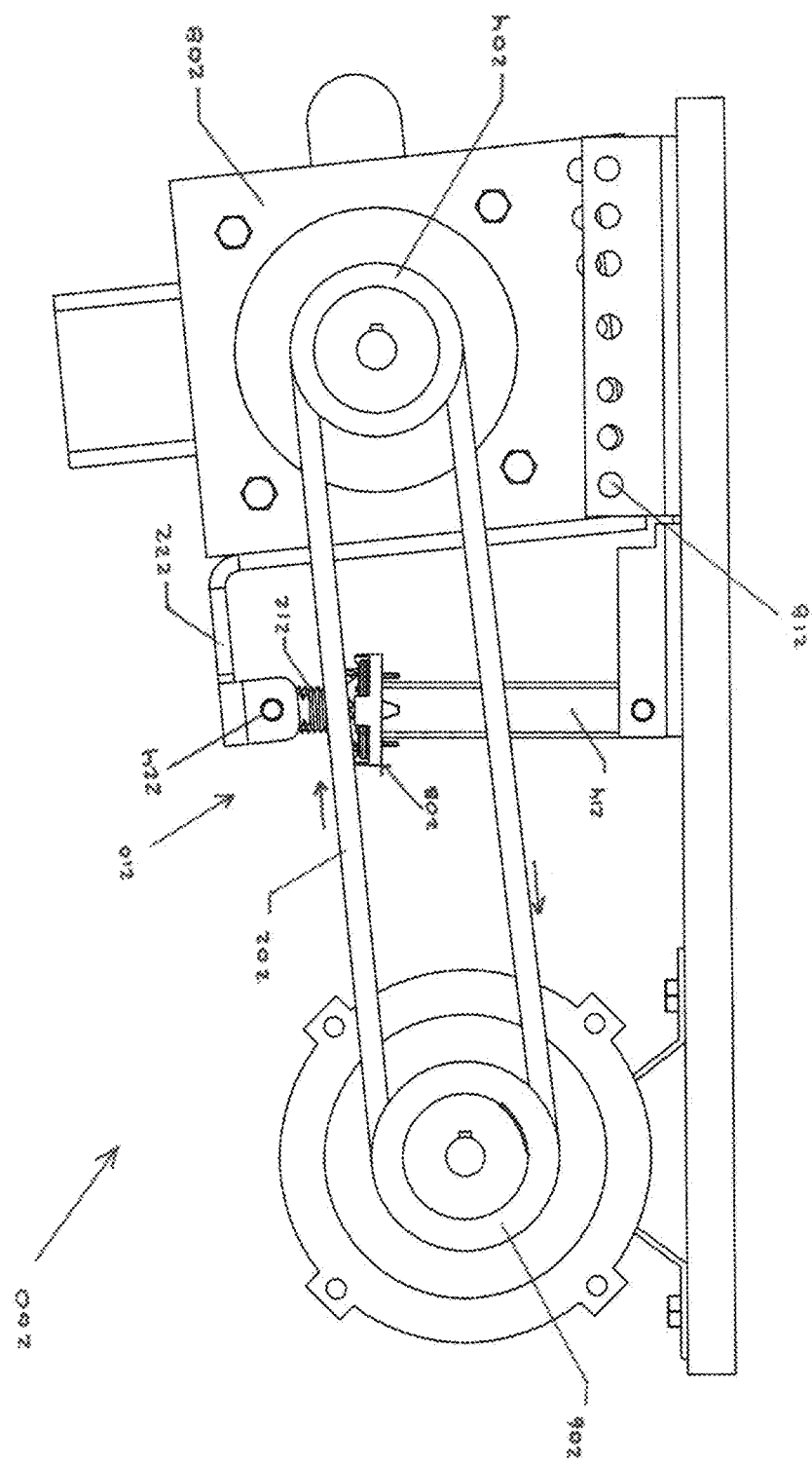
FIG. 19 is a front elevation view of a belt tensioner including the automatic gap adjustor of FIGS. 5-6.
Figure 20:
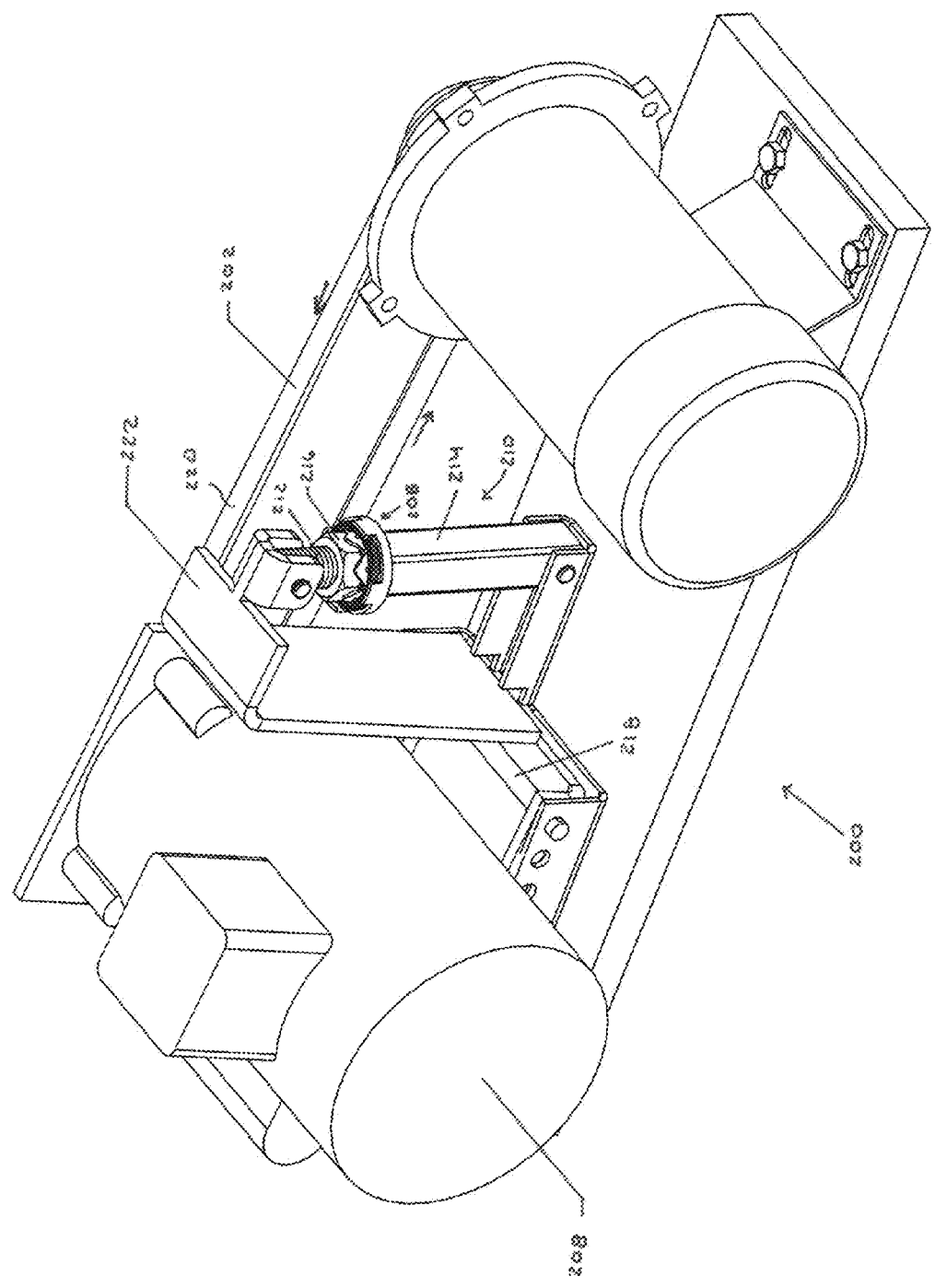
FIG. 20 is rear perspective view of the belt tensioner of FIG. 19.
Figure 21:
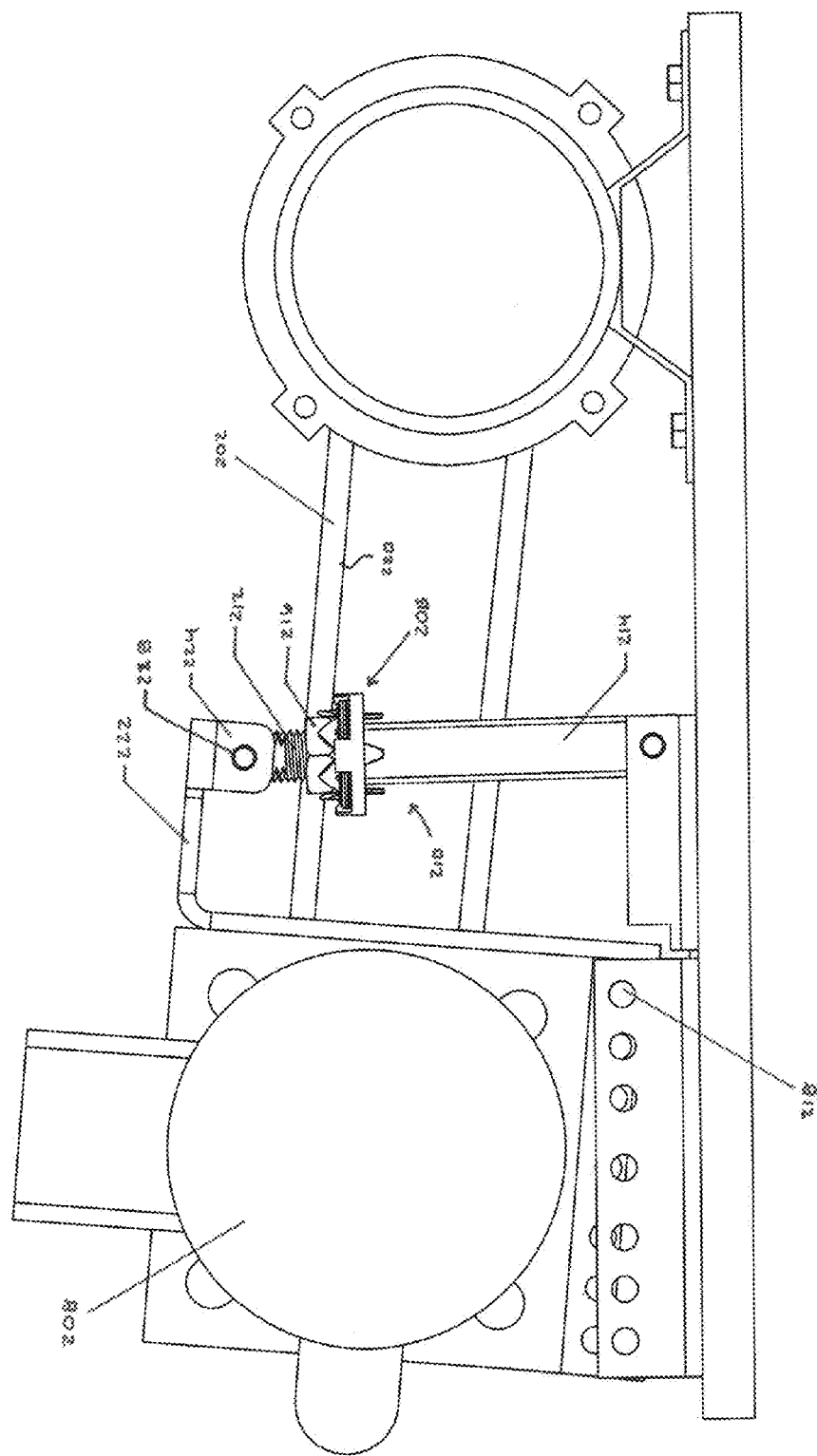
FIG. 21 is a rear elevational view of the belt tensioner of FIG. 19.

In another application of the current embodiments, the automatic gap adjustor 20B can automatically eliminate slack in a drive belt assembly or a drive chain assembly. As shown in FIGS. 19-21 for example, a typical belt assembly 200 can include a V-belt 202 trained about first and second spaced apart pulleys 204, 206. The first pulley 204 can be driven by a motor, a crankshaft, or other mechanism 208 to drive the belt 202 and consequently the second pulley 206. In other embodiments, sprockets can be utilized in place of the first and second pulleys 204, 206, and a cogged belt or chain can be utilized in place of the V-belt 202. The belt 202 can effectively lengthen due to wear and thermal expansion, resulting in slack in the belt 202. As a result, it is generally desirable to take up the slack in the belt 202 by adjusting the distance between the first and second pulleys 204, 206.

To automatically eliminate slack in a belt assembly 200, an automatic belt tensioner 210 is provided. Described below as pertaining to a belt assembly, the tensioner 210 can also be utilized to automatically tension a chain assembly. Referring now to FIG. 19, the automatic belt tensioner 210 includes an externally threaded spacer 212 received within a truncated stanchion 214, an internally threaded nut 216 and an automatic gap adjustor 20B. As explained below, the automatic gap adjustor 20B imparts a rotation on the nut 216 to extend the threaded spacer 212 from within the stanchion 214. By extending the threaded spacer 212 from within the stanchion 214, the first pulley 204 can be rotated about a fulcrum 218 in the clockwise direction as viewed in FIG. 19, thereby distancing the first pulley 204 from the second pulley 206. The threaded spacer 212 can likewise be lowered within the stanchion 214, resulting in rotation of the first pulley 204 in a counter-clockwise direction as viewed in FIG. 19 to reduce the distance separating the first and second pulleys 204, 206. By distancing the first pulley 204 from the second pulley 206, the automatic tensioner 210 can take up slack in the belt 202. By reducing the distance separating the first and second pulleys 204, 206, the belt 202 is unloaded in tension and slackened.

Operation of an automatic belt tensioner 210 can be further understood with reference to FIGS. 20-21. During installation or maintenance of the belt assembly 200, manual rotation of the nut 216 can raise or lower the threaded spacer 212 from within the truncated stanchion 214 to give the first and second pulleys 204, 206 the desired spacing. The weight of the motor 208 operates to pivot the first pulley 204 about the fulcrum 218 and away from the second pulley 206 until the belt 202 restrains further movement of the first pulley 204. Substantially no gap is present when the automatic gap adjustor 20B bears against the upper edge of the truncated spacer 214. However, as the belt 202 expands due to wear, heat or other causes, the threaded spacer 212 can recede from the stanchion 214, resulting in a gap in the region between the automatic gap adjustor 20B and the upper edge of the stanchion 214. At each activation of the motor 208, the first pulley 204 will impart an initial load on the tensioned side 220 of the belt 202. This initial load can promote a sudden kick or jerking of the first pulley 204 in a counter-clockwise direction (as viewed in FIG. 19) about the fulcrum 218 and toward the stationary second pulley 206. A cantilevered arm 222 that moves in unison with the first pulley 204 will momentarily drive the threaded spacer 212 downwardly until the automatic gap adjustor 20B traverses the gap and impacts the upper edge of the stanchion 214, creating a momentary axial compression across the automatic gap adjustor 20B. The automatic gap adjustor 20B can respond to this momentary axial compression by incrementally lowering the threaded nut 216 toward the upper edge of the stanchion 214, gradually displacing the first pulley 204 away from the second pulley 206 to take up slack in the belt 202. As a result, the minimum belt path length is increased (e.g., the distance separating the first and second pulleys 204, 206). As also shown in FIGS. 20-21, the cantilevered arm 222 includes a transverse pin assembly 224 attachable to a bore 226 in the threaded spacer 212 to permit relative rotation about a transverse axis while preventing relative rotation about a vertical axis. In the illustrated configuration, the pin assembly 224 includes a pin 228 spaced apart from and parallel to the fulcrum 218.

Figure 22:
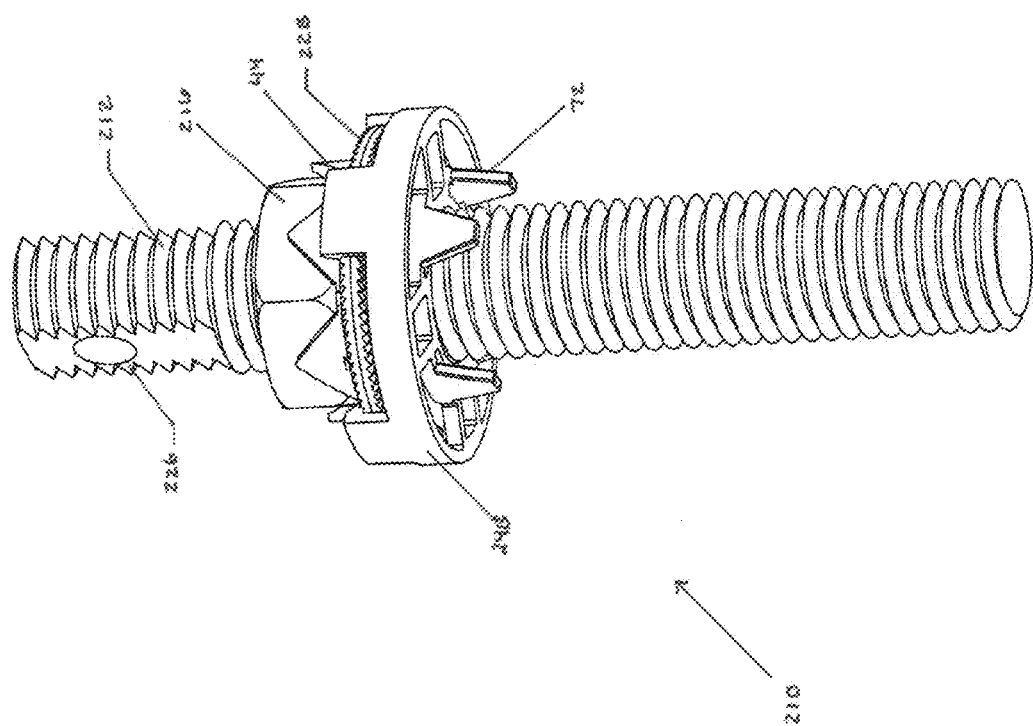
FIG. 22 is a first perspective view of an adjustable belt tensioner including the automatic gap adjustor of FIG. 15.
Figure 23:
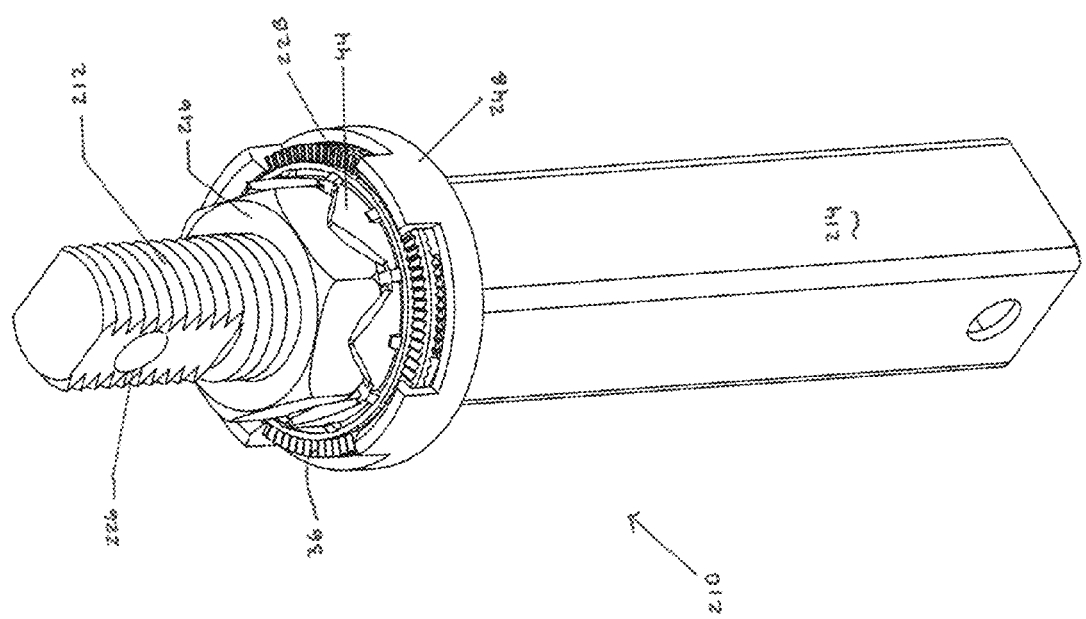
FIG. 23 is a second perspective view of the adjustable belt tensioner of FIG. 22 including a truncated stanchion.

More specifically, and with reference to FIGS. 22-23, the momentary compressive axial load will normally urge the second plurality of cam segments 38 into registration with the third plurality of cam segments 62. Because the second plurality of cam segments 38 is initially radially offset from the third plurality of cam segments 62, the third plurality of cam segments 62 can urge the second plurality of cam segments 38 in a first direction about the threaded spacer 212. As the axial compression diminishes, for example after the initial activation of the motor 208, the spring element 26 upward biasing force can urge the upper disk 22B into registration with the undercut portion of the lower disk 24B. In particular, the upward biasing force can urge the first plurality of cam segments 36 into registration with the fourth plurality of cam segments 64. Because the first plurality of cam segments 36 are now radially offset from the fourth plurality of cam segments 64, the fourth plurality of cam segments 64 urge the first plurality of cam segments 36 in the first direction about the threaded spacer 212. The axial guides 72 on the lower disk 24B prevent rotation of the lower disk 24B relative to the stanchion 214, and the upper disk 22B incrementally rotates the nut 216 further down the threaded spacer 214.

After repeated activations of the motor 208, the automatic gap adjustor 20B can traverse the gap along the threaded spacer 212, bearing against the upper edge of the stanchion 214. When the automatic gap adjustor 20B bears against the upper edge of the stanchion 214, the automatic gap adjustor 20B is generally constrained from downward axial travel along the spacer 212. As a result, the upper and lower disks 22B, 24B are urged together, with the second plurality of cam segments 38 being engaged with the third plurality of cam segments 62. When the second and third plurality of cam segments are urged together, a further axial load will not cause the upper disk 22B to rotate about the threaded spacer 212 relative to the lower disk 24B, and the first pulley 204 will generally be prevented from moving toward the second pulley 206 during activation of the motor 208. Thus, the incremental lowering of the automatic gap adjustor 20B will normally terminate after the lower face 48 of the lower disk 24B is flush with the upper edge of the stanchion 214.

If the threaded spacer 212 again recedes from the stanchion 214, for example due to a lengthening of the belt 202, a gap will develop between the automatic gap adjustor 20B and the stanchion 214. The automatic gap adjustor 20B can operate in the manner noted above to drive the automatic gap adjustor 20B into engagement with the stanchion 214 with each activation of the motor 208, thereby driving the pulleys apart to take up unwanted slack in the belt 202 without manual operation of the automatic belt tensioner 210.

III. Cable Systems

Figure 24:
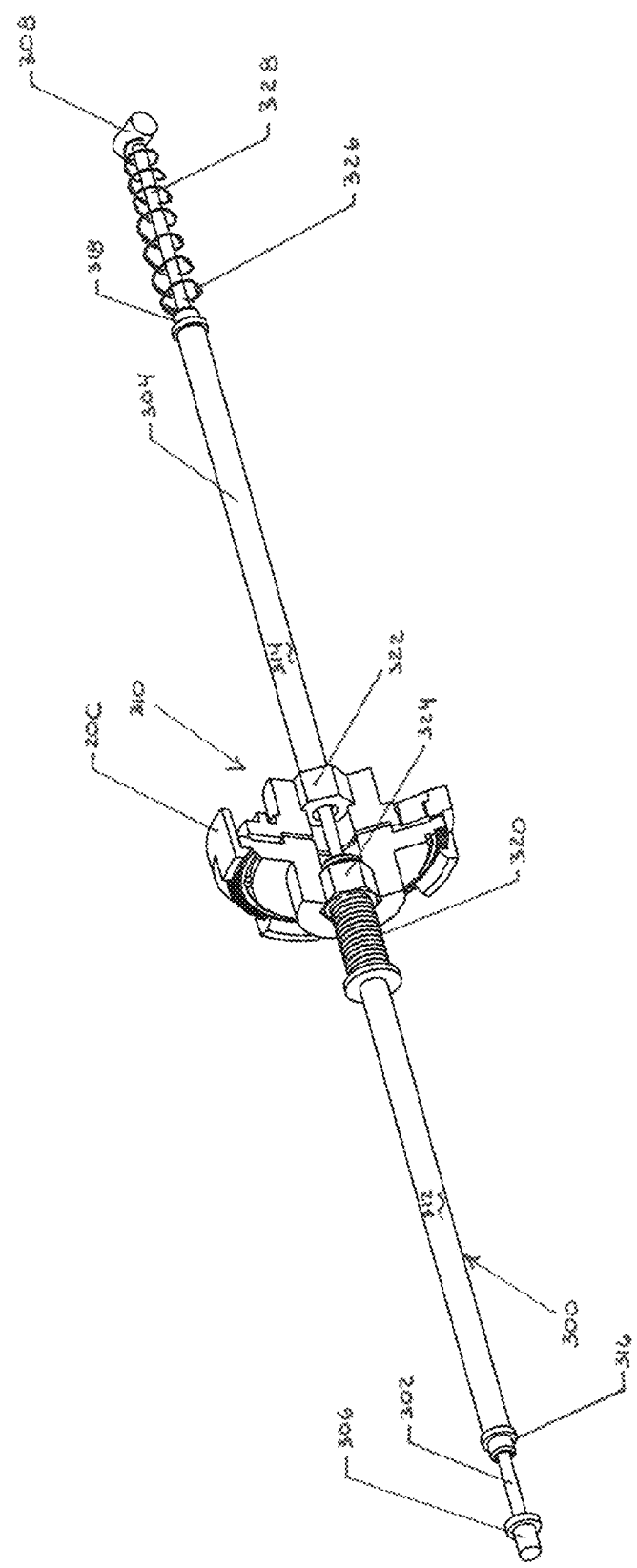
FIG. 24 is a partially cut-away perspective view of cable tensioner including an automatic gap adjustor.

In still another application of the current embodiments, an automatic gap adjustor 20C can be used in combination with a cable assembly 300 to maintain tension across a cable. As shown in FIG. 24, a typical cable assembly 300 includes an inner cable 302 that slides within a sheath or outer sleeve 304. The inner cable 302 includes a first end portion 306 connectable to an actuator, for example a hand controller, and a second end portion 308 connectable to an actuatable device, for example a friction brake having a return spring that releases the brake and tensions the inner cable 302. In use, the first end portion 306 is loaded in tension to transmit a tensile load to the second end portion 308. That is, actuation of the hand controller at the first end portion 306 can displace the cable 302 within the outer sleeve 304 to operate the friction brake at the second end portion 308. The tension in the cable 302 can lessen over repeated actuations, however, potentially causing the friction brake to lag behind actuation of the hand controller.

Figure 25:
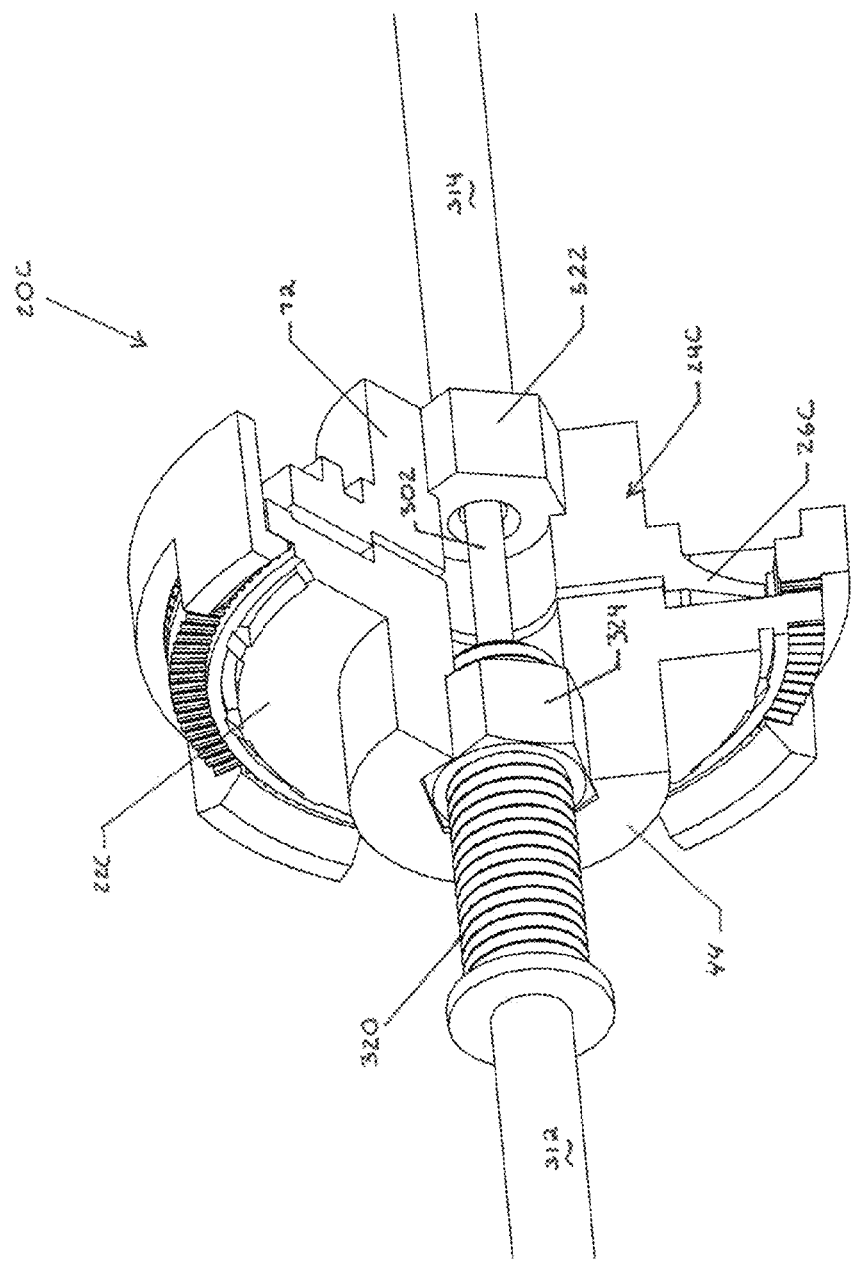
FIG. 25 is a left partially cut-away perspective view of the cable tensioner of FIG. 24.
Figure 26:
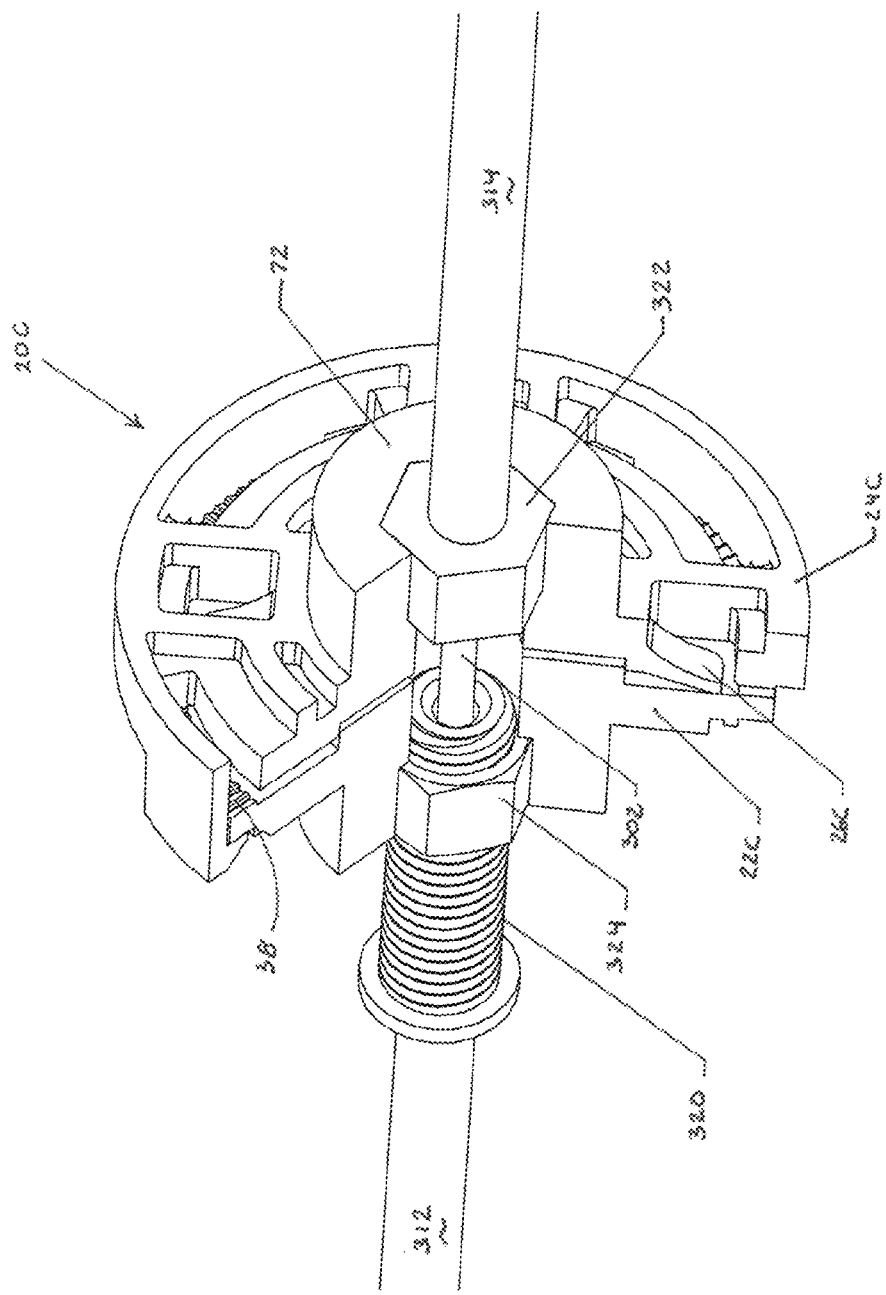
FIG. 26 is a right partially cut-away perspective view of the cable tensioner of FIG. 24.
Figure 27:
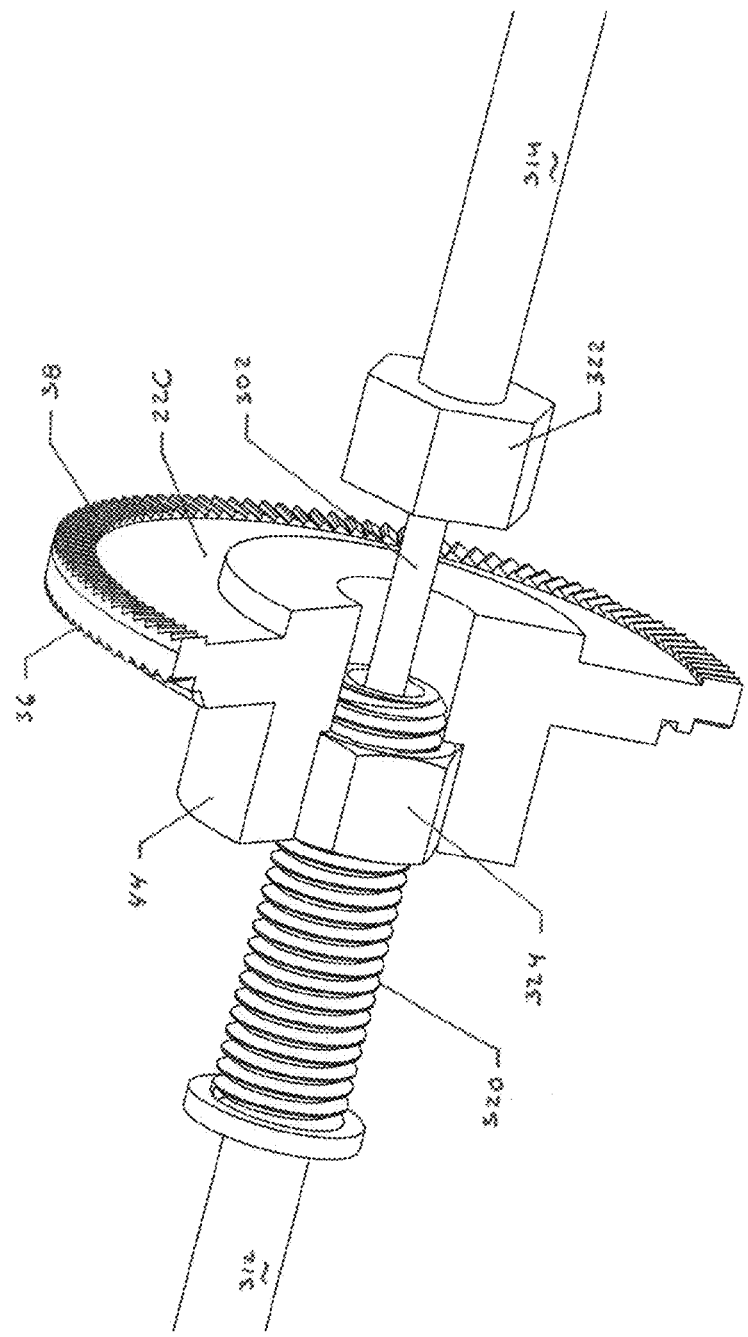
FIG. 27 is a sectioned view of the cable tensioner of FIG. 24 illustrating the upper disk.
Figure 28:
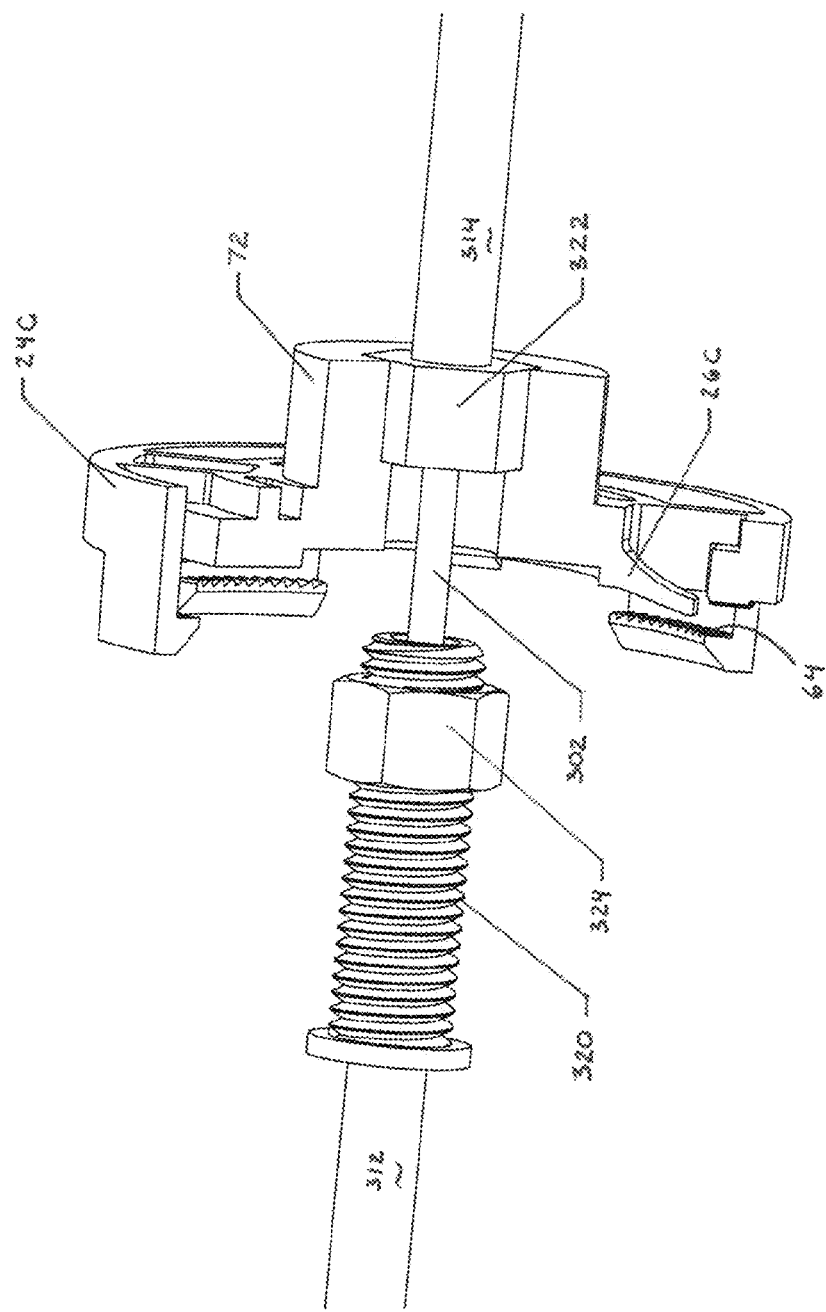
FIG. 28 is a sectioned view of the cable tensioner of FIG. 24 illustrating the lower disk.

To maintain the cable 302 with a desired tension, an automatic cable tensioner 310 is provided. As shown in FIGS. 24-26, the cable tensioner 310 includes an automatic gap adjustor 20C mounted over a gap between bifurcated portions of the outer sleeve 304. A first portion 312 of the outer sleeve 304 extends between the first end 316 of the outer sleeve and a threaded spacer 320. A second portion 314 of the outer sleeve 304 extends between a hexagonal boss 322 and a second end 318 of the outer sleeve 304. The cable 302 traverses the gap between the threaded spacer 320 and the hexagonal boss 322. A threaded nut 324 is rotatably mounted about the threaded spacer 320 to lengthen or shorten the outer sleeve 304. As explained below, the automatic gap adjustor 20C imparts a rotation on the nut 324 to selectively lengthen the outer sleeve 304. Because the cable end portions 306, 308 are prevented from retracting within the outer sleeve 304, lengthening the outer sleeve 304 operates to load the cable 302 in tension.

Optionally, one or both cable end portions 306, 308 can be biased away from the outer sleeve 304 using a biasing device. In some applications, the biasing device includes a compression spring 326 to oppose actuation of the actuator (e.g., a hand lever) and return the cable 302 to its original position within the outer sleeve 304. For example, the biasing devices can include a compression spring 326 coiled about an exposed cable portion 328 to bias the second cable end portion 308 away from the outer sleeve 304. As the outer sleeve lengthens, and assuming the first end of the outer sleeve 316 is stationary, the compression spring 326 is compressed, increasing the tension across the cable 302. As the outer sleeve shortens, the compression spring 326 is unloaded, decreasing the tension across the cable 302. The length of the cable 302 is normally longer than the maximum length of the outer sleeve 304, such that a portion of the cable 302 is always free to extend from at least the first end 316 of the outer sleeve 304.

As the hand controller (or other device) is activated, the cable 302 reciprocates within the outer sleeve 304. The compression spring 326 then drives the second portion 314 of the outer sleeve 304 toward the first potion 312 of the outer sleeve 304. As a result, the lower disk 24C is driven against the upper disk 22C, creating a momentary axial compression across the automatic gap adjustor 20C. The automatic gap adjustor 20C can respond to this momentary axial compression by incrementally rotating the threaded nut 324 to gradually lengthen the outer sleeve 304.

More specifically, and with reference to FIGS. 25-28, the momentary axial compression urges the second plurality of cam segments 38 into registration with the third plurality of cam segments 62. Because the lower disk 24C does not rotate relative to the cable 302, the upper disk 22C is driven in a first direction about the threaded spacer 320. As the axial compression diminishes, for example as the hand controller is released, the spring element 26 urges the upper and lower disks 22C, 24C apart, driving the fourth plurality of cam segments 64 into registration with the first plurality of cam segments 36. As a result, the upper disk 22C is rotated in the first direction to incrementally rotate the nut 324 further down the threaded spacer 320.

After repeated reciprocations of the cable 302 within the outer sleeve 304, the lengthening of the outer sleeve 304 operates to shorten the compression spring 326, thereby increasing the tension across the cable 302. When the force across the shortened compression spring 326 overcomes the biasing force of the spring element 26C, for example the axial spring arms 26C, the upper and lower disks 22C, 24C are urged together, preventing relative rotation therebetween. As a result, further reciprocation of the cable 302 within the outer sleeve 304 will not cause an over-tensioning of the cable 302. If the cable 302 lengthens or otherwise becomes unloaded in tension, the automatic cable tensioner 310 can operate in the manner noted above to incrementally load the cable 302 in tension with each reciprocation.

For illustrative purposes, four automatic gap adjustors 20, 20A, 20B, 20C are disclosed above. Because the cammed teeth can be identical among each of the above automatic gap adjustors, the same nomenclature is used to identify tooth structure, arrangement and function. As used above, directional terminology, including upper/lower, radial/longitudinal, vertical/horizontal, inward/outward and inner/outer, is not intended to limit the present invention, and is instead used for clarity when referring to the accompanying drawings. It is also understood that ordinal terminology (such as "first," "second," "third" and so on) is used merely to indicate a particular feature, so as to distinguish from another feature described by the same term or a similar term. It will be understood that the mere usage of ordinal terminology does not define a numerical limit to the number of features identified.

The above descriptions are those of the current embodiments of the invention. Various alterations and changes can be made without departing from the spirit and broader aspects of the invention. Any reference to elements in the singular, for example, using the articles "a," "an," "the," or "said," is not to be construed as limiting the element to the singular.

The invention claimed is:

1. An automatic gap reducing spacer and preload adjusting device comprising:
   a threaded spacer support that is axially adjustable on a first axis;
   a threaded rotatable adjuster, said rotatable adjuster rotating about the first axis of said spacer support and including an outwardly extending disk portion having a first face and an opposite second face, said first face including a first substantially equally spaced radial pattern of cam segments wherein each cam segment has an exposed ramped surface facing outwardly there from, said second face having a second radial pattern of cam segments wherein each cam segment has an exposed ramped surface facing outwardly there from and said segments are spaced to substantially match with the spacing of said first radial pattern, said cam segments of said second face are mirrored in configuration from said cam segments of said first face except said second radial pattern is angularly shifted about said first axis substantially equal to an angle that is one-half of said segment pattern spacing angle with respect to said first radial pattern; and an adjuster support that is substantially non-rotatable relative to said spacer support, said adjuster support having third and fourth oppositely facing radial patterns of cam segments each having an exposed ramped surface, said third and fourth radial patterns are substantially radially aligned, said third cam segments are configured to mate with the cam segments of said first radial pattern and said fourth cam segments are configured to mate with the cam segments of said second radial pattern, said third radial pattern is spaced apart from said fourth radial pattern to an extent that allows said rotatable adjuster to be rotated about said first axis and move axially along said first axis when portions of said first and second patterns are located there between, wherein rotation of said rotatable adjuster causes said spacer support to move axially along said first axis.

2. The automatic gap reducing spacer and preload adjusting device of claim 1 wherein a forced engagement of the ramped faces of the cam segments of said first radial pattern with the ramped faces of the cam segments of said third radial pattern will cause said rotatable adjuster to rotate if said mating segments are not aligned.

3. The automatic gap reducing spacer and preload adjusting device of claim 1 wherein a forced engagement of the ramped faces of the cam segments of said second radial pattern with the ramped faces of the cam segments of said fourth radial pattern will cause said rotatable adjuster to rotate if said mating segments are not aligned.

4. The automatic gap reducing spacer and preload adjusting device of claim 1 wherein a forced engagement of the ramped faces of the cam segments of said first or second radial pattern with the ramped faces of the cam segments of said third or fourth radial patterns will cause said rotatable adjuster to rotate in the same direction if said mating segments are not aligned.

5. The automatic gap reducing spacer and preload adjusting device of claim 4 wherein the ramped face of the cam segments of said first radial pattern are resiliently biased against the ramped faces of the cam segments of said third radial pattern with sufficient force that can cause said radial patterns to become matingly aligned in full engagement, if said rotatable adjuster is not otherwise constrained from further axial travel.

6. The automatic gap reducing spacer and preload adjusting device of claim 5 wherein a force against said spacer support sufficient to overcome said resiliently biasing force, in the opposite direction of said biasing force, can be adequate to force engagement of the ramped faces of the cam segments of said second radial pattern with the ramped faces of the cam segments of said fourth radial pattern to cause said rotatable adjuster to become matingly aligned in full engagement, if said rotatable adjuster is not otherwise constrained from further axial travel.

7. The automatic gap reducing spacer and preload adjusting device of claim 6 wherein alternating said overcoming force and said resiliently biasing force will cause said rotating adjuster to rotate in stepped increments and said spacer support will move along said first axis in stepped increments, driven by threaded engagement with said rotating adjuster.

8. An automatic gap adjustor assembly comprising:
an upper disk including an upper axial surface defining a first plurality of cam segments and a lower axial surface defining a second plurality of cam segments;
a lower disk including an upper axial surface defining a third plurality of cam segments and an undercut portion defining a fourth plurality of cam segments, the third plurality of cam segments being spaced apart from the fourth plurality of cam segments for receipt of the upper disk therebetween; and
a spring element interposed between the upper and lower disks, wherein reciprocating axial movement of the upper disk against the spring element achieves an automatic stepped rotation of the upper disk relative to the lower disk in response to the second plurality of cam segments engaging the third plurality of cam segments and in response to the first plurality of cam segments engaging the fourth plurality of cam segments, wherein the upper disk, the lower disk and the spring element are mounted about a threaded spacer.

9. The automatic gap adjustor of claim 8 wherein:
the second and third plurality of cam segments are urged together under a compressive load; and
the first and fourth plurality of cam segments are urged together by the spring element in the absence of the compressive load.

10. The automatic gap adjustor of claim 8 wherein each plurality of cam segments includes a plurality of ramped cam surfaces each spanning substantially the same angle and each defining substantially the same pitch.

11. The automatic gap adjustor of claim 8 wherein the first plurality of cam segments is radially offset from the second plurality of cam segments.

12. The automatic gap adjustor of claim 8 wherein the third plurality of cam segments is radially offset from the fourth plurality of cam segments.

13. The automatic gap adjustor of claim 8 wherein the upper disk is prevented from rotating relative to the lower disk in response to the lower disk being constrained from axial travel along the threaded spacer.

* * * * *